United States Patent
Deng et al.

(10) Patent No.: US 12,510,410 B2
(45) Date of Patent: Dec. 30, 2025

(54) SPECTRAL IMAGING DEVICE

(71) Applicant: Beijing Seetrum Technology Co., Ltd., Beijing (CN)

(72) Inventors: Boyu Deng, Beijing (CN); Zhilei Huang, Beijing (CN); Yu Wang, Beijing (CN); Zhou Wang, Beijing (CN)

(73) Assignee: BEIJING SEETRUM TECHNOLOGY CO., LTD., Beijing (CN)

( * ) Notice: Subject to any disclaimer, the term of this patent is extended or adjusted under 35 U.S.C. 154(b) by 49 days.

(21) Appl. No.: 18/423,813

(22) Filed: Jan. 26, 2024

(65) Prior Publication Data
US 2024/0167875 A1    May 23, 2024

Related U.S. Application Data

(62) Division of application No. 17/941,381, filed on Sep. 9, 2022, now Pat. No. 11,920,981.

(30) Foreign Application Priority Data

Sep. 10, 2021 (CN) .......................... 202111059574.2
Sep. 29, 2021 (CN) .......................... 202111151672.9
(Continued)

(51) Int. Cl.
*G01J 3/28* (2006.01)

(52) U.S. Cl.
CPC ..... *G01J 3/2823* (2013.01); *G01J 2003/2826* (2013.01)

(58) Field of Classification Search
CPC ............. G01J 3/2823; G01J 2003/2826; G01J 3/0264; G01J 2003/283; G01J 3/28
See application file for complete search history.

(56) References Cited

U.S. PATENT DOCUMENTS 11,743,577 B2 * 8/2023 Ogino .................... H04N 23/64
                                                          348/222.1
2006/0017924 A1  1/2006 Kowarz et al.
(Continued)

FOREIGN PATENT DOCUMENTS

CN       110501072        11/2019
EP       4 053 521         9/2022
(Continued)

OTHER PUBLICATIONS

English Translation of KR 10-2020-0094062 A (Year: 2020).
(Continued)

*Primary Examiner* — Mi'Schita' Henson
(74) *Attorney, Agent, or Firm* — Wenderoth, Lind & Ponack, L.L.P.

(57) ABSTRACT

The present application relates to a spectral restoring method including: receiving and modulating incident light by a filter included in a spectral imaging device; acquiring a light energy response signal matrix output by an image sensor of the spectral imaging device and a standard spectrum; determining a primitive restoring function and a response signal vector of the primitive restoring function based on the light energy response signal matrix, the primitive restoring function restoring a spectral image value of a predetermined channel corresponding thereto using a predetermined pixel value of the photosensitive chip and pixel values in the vicinity thereof; acquiring a restoring tensor, the product of the restoring tensor and the response signal vector being equal to an output of the primitive restoring function based on the response signal vector; and obtaining a restored spectral image based on the product of the restoring tensor and the response signal vector.

17 Claims, 8 Drawing Sheets

(30) Foreign Application Priority Data

Sep. 29, 2021 (CN) .......................... 202111154656.5
Jan. 26, 2022 (CN) .......................... 202210095685.7

(56) References Cited

U.S. PATENT DOCUMENTS

2007/0146700 A1    6/2007  Kowarz et al.
2016/0316111 A1*  10/2016  Wachi ................... H04N 25/76
2025/0150556 A1*   5/2025  Fine .................. G02B 21/0008

FOREIGN PATENT DOCUMENTS

KR    10-2020-0094062    8/2020
WO       2021/085014     5/2021

OTHER PUBLICATIONS

English Translation of CN 110501072 A (Year: 2019).
Hong Ke., "RGB and Hyperspectral Image Fusion Based on Superpixel Segmentation," School of Electrical Engineering, Electronic Technology & Software Engineering, Mar. 30, 2020, pp. 74-76, with partial machine translation.

* cited by examiner

SPECTRAL IMAGING DEVICE

FIELD OF THE INVENTION

The present application relates to the technical field of spectral imaging, and more particularly to a spectral imaging device for outputting at least two spectral images in parallel.

BACKGROUND OF THE INVENTION

In order to assist a photographer in correctly photographing a target scene at the time of using a spectral camera, it is necessary to provide the photographer with a real-time RGB image that is consistent with an object imaged by a spectral photograph. Due to the limitations of conventional spectral imaging devices, the current methods to meet the above needs mainly include the following two methods:

separately performing RGB imaging using a module other than a module for multi-spectral imaging; and obtaining a multi-spectral image using a multi-spectral imaging camera, and then computing a RGB image using the multi-spectral image.

The above two methods have drawbacks that the results of RGB images and spectral imaging cannot be unified in time or space, or the color of RGB images is not real enough.

Accordingly, it is desirable to provide a spectral imaging device for outputting at least two spectral images in parallel.

SUMMARY OF THE INVENTION

In order to solve the above technical problems, the present application is provided. Examples of the present application provide a spectral imaging device for outputting at least two spectral images in parallel, wherein the at least two spectral images are output in parallel by one spectral imaging device, thereby achieving structural unification of the at least two spectral images.

Examples of the present application further provide a spectral restoring method, wherein by introducing a standard spectrum and a restoring tensor to restore a spectral image, it is possible to achieve spectral restoration with high speed, easy parallel operation and high restoring accuracy.

Examples of the present application further provide a spectral restoring method for spectral image reconstruction, wherein by training a deep learning network to output spectral images directly from reconstruction functions and response signals, it is possible to achieve construction of high-quality spectral images with low cost.

According to an aspect of the present application, a spectral imaging device for outputting at least two spectral images in parallel is provided. The spectral imaging device includes: a filter for modulating incident light; an image sensor for receiving the modulated incident light to obtain an output signal in response to the modulated incident light; and a data processing unit for obtaining data of at least two spectral images through a corresponding image restoring algorithm and converting the data into the at least two spectral images.

The above spectral imaging device further includes a receiver for receiving the incident light.

In the above spectral imaging device, the at least two spectral images include a spectral image and a RGB image.

In the above spectral imaging device, the data processing unit includes a client terminal, and the client terminal includes a control module for controlling the image sensor and a display module for displaying the at least two spectral images.

In the above spectral imaging device, the data processing unit includes a server, and the server includes a control unit and a processing unit, and the control unit is configured to control the processing unit to select a corresponding image restoring algorithm to process the output signal of the image sensor, and the processing unit is configured to process the output signal of the image sensor to obtain the data of the at least two spectral images.

In the above spectral imaging device, the number of the spectral images is greater than or equal to two, and the number of spectral image channels of each spectral image is greater than or equal to one.

In the above spectral imaging device, the number of spectral image channels of each spectral image is greater than or equal to three.

The above spectral imaging device further includes: a sliding window unit for adjusting a spatial resolution, a temporal resolution and a spectral resolution of the spectral imaging device by adjusting the size and step length of a sliding window.

In the above spectral imaging device, the data processing unit obtains spectral image data and RGB image data using a first multi-spectral image restoring algorithm and a second RGB image restoring algorithm, respectively.

In the above spectral imaging device, the data processing unit obtains spectral image data of a first number of channels using a second multi-spectral image restoring algorithm, and divides the spectral image data of the first number of channels into spectral image data of a second number of channels and RGB image data of a third number of channels.

In the above spectral imaging device, the sum of the second number of channels and the third number of channels is less than or equal to the first number of channels.

According to another aspect of the present application, a spectral restoring method is provided. The spectral restoring method includes: acquiring a light energy response signal matrix output by a photosensitive chip of a spectral imaging device and a standard spectrum; determining a primitive restoring function and a response signal vector of the primitive restoring function based on the light energy response signal matrix, wherein the primitive restoring function restores a spectral image value of a predetermined channel corresponding thereto using a predetermined pixel value of the photosensitive chip and pixel values in the vicinity thereof; acquiring a restoring tensor, wherein the product of the restoring tensor and the response signal vector is equal to an output of the primitive restoring function based on the response signal vector; and obtaining a restored spectral image based on the product of the restoring tensor and the response signal vector.

In the above spectral restoring method, the light energy response signal matrix is represented as a matrix B including two dimensions of an image width w and an image height h, and the number of dimensions of the standard spectrum is l, and a distance from the product of a spectral image true value tensor received by the spectral imaging device and the standard spectrum to a spectral image tensor to be restored is set to be minimum.

In the above spectral restoring method, the standard spectrum is represented as s, and a channel standard spectrum corresponding to a $k^{th}$ channel of the standard spectrum is represented as $S_k$, whereby:

$$x_k \to O(i,j)s_k$$

where $x_k$ is a spectral image value of the $k^{th}$ channel of a certain spectral pixel, $O(i,j)$ is a spectral curve true value tensor of a certain spectral pixel, and → represents that a Euclidean distance between tensors is minimum.

In the above spectral restoring method, the primitive restoring function uses pixel values at a distance of a predetermined threshold p from the predetermined pixel in width and height, and a response signal vector of the predetermined pixel is denoted as $\hat{b}$, represented as:

$$f_{i,j,k}(B(i-p:i+p,j-p:j+p))=f_{i,j,k}(\hat{b}_{i,j})=f_{i,j,k}(\hat{b}).$$

In the above spectral restoring method, the restoring tensor is denoted as C, and a channel restoring vector for restoring a value of the $k^{th}$ channel of the predetermined pixel in the restoring tensor is denoted as $c_k$, then:

$$f_k(\hat{b})=c_k \cdot \hat{b}$$

where $f_k(\hat{b})$ is an output of the primitive restoring function based on the response signal vector $\hat{b}$.

In the above spectral restoring method, a solving process of the restoring tensor includes: establishing a first constraint equation based on the restoring tensor, a spectral response tensor block of the spectral response tensor of the spectral imaging device corresponding to the primitive restoring function, and the standard spectrum; establishing a second constraint equation based on the restoring tensor and the spectral response tensor block; and obtaining the restoring tensor based on the first constraint equation and the second constraint equation.

In the above spectral restoring method, the first constraint equation is that the product of the channel restoring vector $c_k$, a spectral response tensor block $\hat{A}$ corresponding to the primitive restoring function in the spectral response tensor, and the channel standard spectrum $s_k$ is equal to one, represented as:

$$c_k \hat{A} s_k = 1$$

where $\hat{A}$ is a spectral response tensor block $A(i-p:i+p,j-p:j+p,:)$ of the spectral response tensor of the spectral imaging device for restoring $X_{i,j}$, and first and second orders of the tensor block are rearranged to the same order to form a matrix in the shape of $(a^2,l)$, and the spectral response tensor is represented as a tensor A including three dimensions: an image width w, an image height h and a calibration resolution l.

In the above spectral restoring method, the second constraint equation is that the product of the channel restoring vector $c_k$, a spectral response tensor block $\hat{A}$ corresponding to the primitive restoring function in the spectral response tensor, and a unit vector is constrained to 0, represented as:

$$c_k \hat{A} e \to 0$$

where e is a unit vector.

In the above spectral restoring method, obtaining the restoring tensor based on the first constraint equation and the second constraint equation includes: obtaining the restoring tensor based on the first constraint equation, the second constraint equation and a third constraint equation, and the third constraint equation is that the product of a 2-norm of the product of a Tikhonov matrix and the channel restoring vector $c_k$ and a Lagrange multiplier $\lambda$ of a regular term is constrained to 0, represented as:

$$\lambda \|Dc_k\|_2 \to 0.$$

In the above spectral restoring method, solving the first constraint equation, the second constraint equation and the third constraint equation to obtain the restoring tensor includes: multiplying the first constraint equation by a sensitivity coefficient, and adding the product to the second constraint equation and the third constraint equation to obtain a combination equation, represented as:

$$g(c_k)=(c_k \hat{A} e)^2 + \lambda \|Dc_k\|_2^2 + \alpha(c_k \hat{A} s_k - 1)^2 \to 0;$$

deriving and zeroing the combination equation, represented as:

$$g'(c_k)=0;$$

obtaining the channel restoring vector as:

$$c_k = \alpha(\hat{A}^T e^T e \hat{A} + \lambda D^T D + \alpha s_k^T \hat{A}^T \hat{A} s_k)^{-1} \cdot \hat{A} s_k;$$

iterating the above steps to obtain the entire restoring tensor as:

$$C(i,j,:,k)=\alpha(\hat{A}_{i,j}^T \hat{A}_{i,j} + \lambda D^T D + \alpha s_k^T \hat{A}_{i,j}^T \hat{A}_{i,j} s_k)^{-1} \cdot \hat{A}_{i,j} s_k.$$

In the above spectral restoring method, the second constraint equation is that a 2-norm of the product of the channel restoring vector $c_k$ and a spectral response tensor block $\hat{A}$ corresponding to the primitive restoring function in the spectral response tensor is constrained to 0, represented as:

$$\|c_k \hat{A}\|_2 \to 0.$$

In the above spectral restoring method, obtaining the restoring tensor based on the first constraint equation and the second constraint equation includes obtaining the restoring tensor based on the first constraint equation, the second constraint equation and the third constraint equation, and includes: multiplying the first constraint equation by a sensitivity coefficient, and adding the product to the second constraint equation and the third constraint equation to obtain a combination equation, represented as:

$$g(c_k)=\|c_k \hat{A}\|_2^2 + \lambda \|(Dc_k)\|_2^2 + \alpha(c_k \hat{A} s_k - 1)^2 \to 0;$$

deriving and zeroing the combination equation, represented as:

$$g'(c_k)=0;$$

obtaining the channel restoring vector as:

$$c_k = \alpha(\hat{A}^T \hat{A} + \lambda D^T D + \alpha s_k^T \hat{A}^T \hat{A} s_k)^{-1} \cdot \hat{A} s_k.$$

In the above spectral restoring method, the first constraint equation is represented as:

$$f_k(\hat{b}, \hat{A} s_k)=1$$

where $f_k$ is a neural network composed of a connection layer and an activation layer, and $\hat{A}$ is a spectral response tensor block $A(i-p:i+p,j-p:j+p,:)$ corresponding to the primitive restoring function in the spectral response tensor, and first and second orders of the tensor block being rearranged to the same order to form a matrix in the shape of $(a^2,l)$.

In the above spectral restoring method, the second constraint equation is represented as:

$$f_k(\hat{b}, \hat{A}) \to 0.$$

In the above spectral restoring method, obtaining the restoring tensor based on the first constraint equation and the second constraint equation includes:

obtaining the restoring tensor based on the first constraint equation, the second constraint equation and the third constraint equation, the third constraint equation being represented as:

$$f_k(N*\hat{b}, \hat{A} s_k) \to 1$$

$$f_k(N*\hat{b}, \hat{A}) \to 0$$

where N is a noise factor and is a random number matrix in the shape of (a, a), which is expected to be 0 and obeys a Gaussian distribution.

The above spectral restoring method further includes: establishing a fourth constraint equation:

$$f_k(N*\hat{b}, \hat{A}t) \rightarrow t \cdot s_k.$$

In the above spectral restoring method, solving the first constraint equation, the second constraint equation and the third constraint equation to obtain the restoring tensor includes training the neural network based on a data set for spectral restoring by the trained neural network.

According to yet another aspect of the present application, a spectral image reconstruction method is provided. The spectral image reconstruction method includes: acquiring transmission spectrum data of a spectral imaging chip and output signal data of the spectral imaging chip; acquiring local transmission spectrum data of the transmission spectrum data and local output signal data of the output signal data based on an image element for spectral image reconstruction; inputting the local output signal data into an attention model to obtain attention local data; and inputting the local transmission spectrum data, the local output signal data and the attention local data into a neural network model to obtain the image element for spectral image reconstruction.

In the above spectral restoring method, acquiring local transmission spectrum data of the transmission spectrum data and local output signal data of the output signal data based on pixels for reconstructing a spectral image includes: acquiring, based on a position of the image element for spectral image reconstruction, local transmission spectrum data of the transmission spectrum data having a side length equal to a predetermined number of pixels and local output signal data of the output signal data within a region near the position.

In the above spectral restoring method, inputting the local output signal data into an attention model to obtain attention local data includes: dividing the local output signal data into a plurality of predetermined regions, each predetermined region including output signal data corresponding to a plurality of pixels of the spectral imaging chip; and performing matrix multiplication for each of the predetermined regions to obtain the attention local data.

In the above spectral restoring method, inputting the local output signal data into an attention model to obtain attention local data includes: normalizing the transmission spectrum data and the output signal data into an interval [−1, 1].

In the above spectral restoring method, inputting the local transmission spectrum data, the local output signal data and the attention local data into a neural network model to obtain the image element for spectral image reconstruction includes: cascading the local transmission spectrum data for each spectral resolution in the local transmission spectrum data, the local output signal data, and the attention local data across a thickness dimension to obtain a cascaded tensor; cascading a plurality of cascaded tensors corresponding to a plurality of spectral resolutions of the local transmission spectrum data across the thickness dimension to obtain an input tensor; inputting the input tensor into a 3D convolutional neural network to obtain an output feature map, the thickness dimension of the output feature map being the same as the number of channels of a spectral image to be reconstructed; and inputting each feature map of the output feature map across the thickness dimension into a fully connected network to obtain the image element for spectral image reconstruction.

In the above spectral restoring method, input data and output data of the 3D convolutional neural network each include four dimensions: a data length, a data width, a data thickness, and the number of channels, the data thickness is equal to the number of iterations of the 3D convolutional neural network, and the number of channels of the input data is one.

In the above spectral restoring method, the 3D convolutional neural network includes convolutional layers, activation layers and pooling layers. The first convolutional layer has a step length of $a^2+3$, where a is the square root of the number of predetermined regions in the attention model, and the remaining convolutional layers have a step length of 1. The first convolutional layer uses a Sigmoid activation function, and the remaining layers use a Leaky RELU activation function. The pooling layers are all max pooling layers having length and width orders of 2 and a variable thickness order. The number of channels of each layer of convolutional network is twice the number of channels of a layer thereon.

In the above spectral restoring method, training data of the 3D convolutional neural network and the fully connected network includes at least one of the following: the transmission spectrum data and the output signal data obtained based on a still life hyper-spectral photograph captured using a high-precision spectral camera having different modulation layers; the output signal data obtained by performing simulated imaging on a hyper-spectral image in a hyper-spectral data set acquired in a public channel using the plurality of transmission spectrum data in a product database; and transmission spectrum data and output signal data obtained by adding noise to the above transmission spectrum data and output signal data.

In the above spectral restoring method, a training process of the 3D convolutional neural network and the fully connected network includes: dividing the entire picture into patches having a side length equal to a predetermined length according to random center coordinates; hashing and reordering spectral truth values corresponding to the patches; and inputting a batch composed of disarranged patches and corresponding spectra into a model for training In the above spectral restoring method, inputting the local transmission spectrum data, the local output signal data and the attention local data into a neural network model to obtain the image element for spectral image reconstruction includes: cascading the local transmission spectrum data, the local output signal data and the attention local data to obtain input data; and inputting the input data into a fully convolutional network to obtain the image element for spectral image reconstruction.

In the above spectral restoring method, the fully convolutional network includes a predetermined number of down-sampled convolutional neural networks and the predetermined number of up-sampled convtranspose neural networks, and each convolutional layer in the down-sampled convolutional neural networks has 2-times max pooling, and the number of channels thereof is twice the number of channels of the previous convolutional layer, and each convolutional layer of the up-sampled convtranspose neural networks has 2-times unpooling, and the number of channels thereof is one half of the number of channels of the previous convolutional layer, and an output tensor of each convolutional layer in the down-sampled convolutional neural network is spliced with an output tensor of each convolutional layer in the up-sampled convtranspose neural networks, and the number of channels of an output layer of the fully convolutional network is the number of channels of a spectral image to be reconstructed.

In the above spectral restoring method, a training process of the fully convolutional network includes: acquiring a RGB three-channel pre-training model; freezing all pre-training parameters, and preliminarily training an input layer and an output layer; and gradually unfreezing the pre-training parameters symmetrically, and reducing a learning rate to achieve training of the entire fully convolutional network.

According to the spectral imaging device for outputting at least two spectral images in parallel provided by the present application, at least two spectral images can be output in parallel by one spectral imaging device, thereby achieving structural unification of the at least two spectral images.

According to the spectral restoring method provided by the present application, a spectral image can be restored by introducing a standard spectrum and a restoring tensor, thereby achieving spectral restoring with high speed, easy parallel operation and high restoring accuracy.

According to the spectral restoring method for spectral image reconstruction provided by the present application, spectral images can be output directly from reconstruction functions and response signals by training a deep learning network, thereby achieving construction of high-quality spectral images with low cost.

BRIEF DESCRIPTION OF THE DRAWINGS

Various other advantages and benefits of the present application will become apparent to those ordinarily skilled in the art upon reading the following detailed description of preferred specific implementations. The drawings are only for purposes of illustrating the preferred implementations and are not to be construed as limiting the present application. Obviously, the drawings accompanying in the following description are merely some examples of the present application. Those ordinarily skilled in the art may also obtain other drawings according to these drawings without involving any inventive effort. Also throughout the drawings, the same reference numerals represent the same components.

DETAILED DESCRIPTION OF THE INVENTION

Exemplary examples according to the present application will be described in detail below with reference to the accompanying drawings. It is apparent that the described examples are merely a few examples of the present application and not all examples of the present application. It should be understood that the present application is not limited to the exemplary examples described herein.

Schematic Spectral Imaging Device

Figure 1:
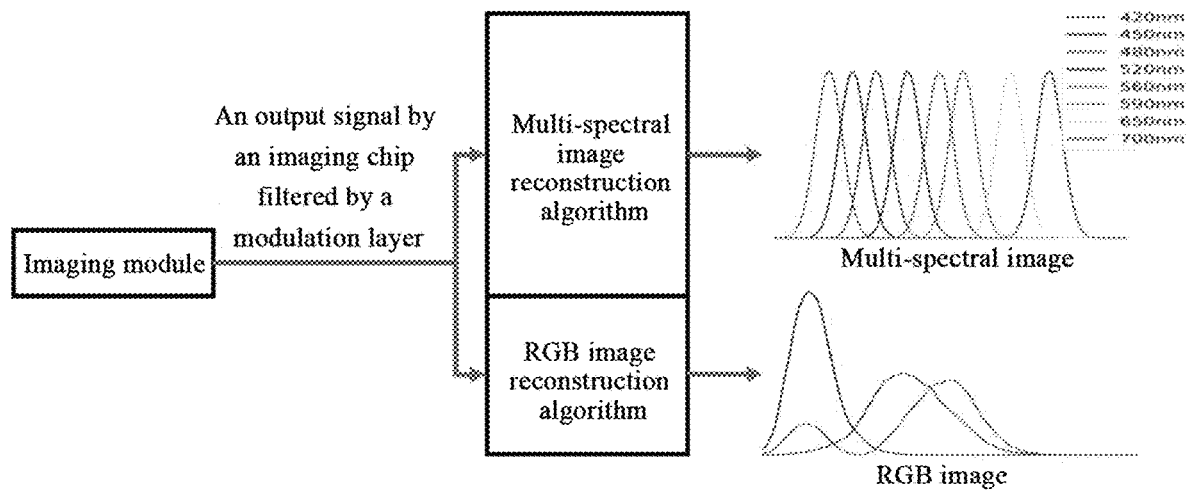
FIG. 1 illustrates a schematic imaging diagram of a spectral imaging device for outputting at least two spectral images in parallel according to an example of the present application.

FIG. 1 illustrates a schematic imaging diagram of a spectral imaging device for outputting at least two spectral images in parallel according to an example of the present application.

As shown in FIG. 1, a spectral imaging device for outputting at least two spectral images in parallel according to an example of the present application may output at least two spectral images in parallel through one spectral imaging apparatus. For example, at least two spectral images are output in parallel, or at least one spectral image and RGB image are output in parallel. The spectral image and the RGB image may be a single-channel monochrome spectral image and RGB image, or may also be a spectral image and a RGB image of two or more channels.

That is, an original signal is acquired by a spectral imaging device firstly. The spectral imaging device includes a filter and an image sensor. The filter modulates incident light. The modulated incident light is received by the image sensor (i.e. an imaging chip). An output signal of the image sensor in response to the modulated incident light is obtained. Then, data of at least two required spectral images such as spectral image data and RGB image data may be obtained by means of a corresponding image restoring algorithm, and the spectral image data and the RGB image data may be converted into corresponding images, whereby one spectral imaging device may output at least two spectral images in parallel.

Figure 2:
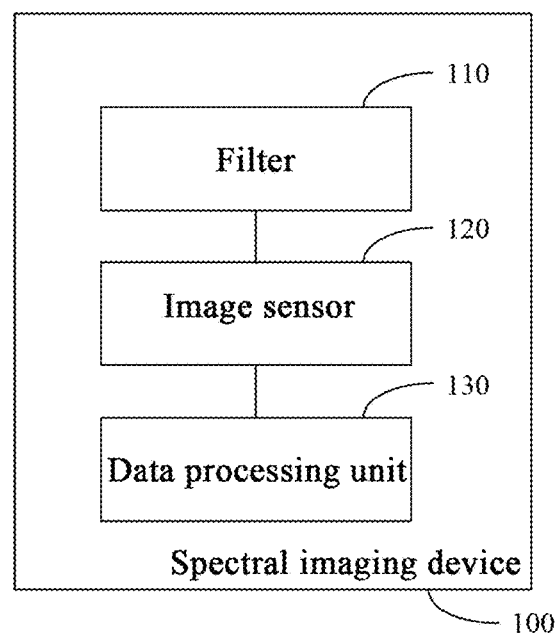
FIG. 2 illustrates a schematic block diagram of a spectral imaging device for outputting at least two spectral images in parallel according to an example of the present application.

FIG. 2 illustrates a schematic block diagram of a spectral imaging device for outputting at least two spectral images in parallel according to an example of the present application.

As shown in FIG. 2, a spectral imaging device 100 for outputting at least two spectral images in parallel according to an example of the present application includes: a filter 110 for modulating incident light; an image sensor 120 for receiving the modulated incident light to obtain an output signal in response to the modulated incident light; and a data processing unit 130 for obtaining data of at least two spectral images through a corresponding image restoring algorithm and converting the data into the at least two spectral images.

Furthermore, the above spectral imaging device 100 may further include a receiver for receiving incident light. For example, the receiver may optionally be an optical component such as a lens group.

Here, the spectral imaging device according to an example of the present application may be implemented as an imaging system including a client terminal and a server. Specifically, FIG. 3 illustrates a schematic diagram of an imaging system for outputting at least two spectral images in parallel according to an example of the present application.

Figure 3:
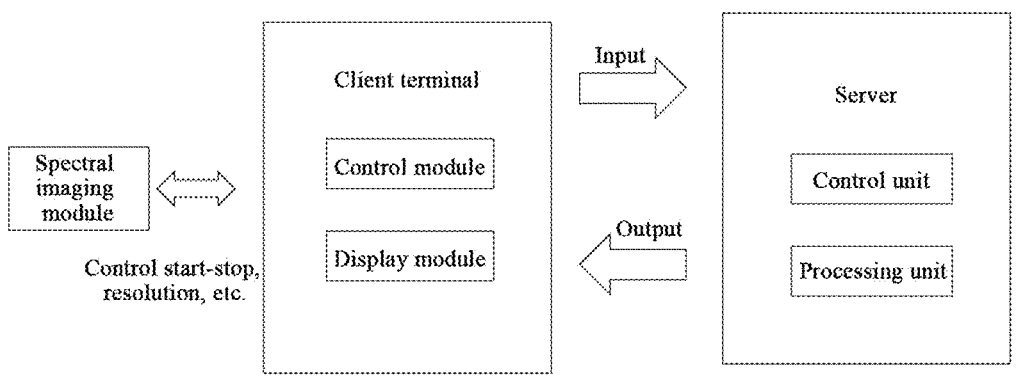
FIG. 3 illustrates a schematic diagram of an imaging system for outputting at least two spectral images in parallel according to an example of the present application.

As shown in FIG. 3, the imaging system may include a spectral imaging module, a client terminal and a server. The spectral imaging module may be, e.g., the same as an imaging module shown in FIG. 1, for obtaining incident light, filtering by a modulation layer, and then outputting a response signal of an imaging chip (i.e. an image sensor). The response signal is transmitted to the client terminal including a control module and a display module. The control module may control the spectral imaging module, e.g., control the start and stop of the spectral imaging module. It will be understood that the operation of the image sensor of the spectral imaging module may be controlled, and an imaging resolution of the spectral imaging module may be adjusted, etc. Also, the display module may be configured to display at least two spectral images generated, such as a spectral image and a RGB image. Further, the server may include a control unit and a processing unit, and store a corresponding image restoring algorithm. The control unit controls the processing unit to select the corresponding image restoring algorithm to process a response signal output by the imaging module. The processing unit obtains data of at least two corresponding spectral images after processing, such as spectral image data and RGB image data, and then transmits the image data to the client for display.

That is, in an example of the present application, the spectral imaging module may be a monocular camera, and data sources of a spectral image and a RGB image are derived from the same imaging module. It can be further understood that a group of such data sources may simultaneously restore at least two spectral images, such as a spectral image and a RGB image.

In addition, it will be understood by those skilled in the art that in some specific examples, the spectral imaging module and the client terminal may also be integral, for example, implemented as a spectral imaging apparatus that may display at least two spectral images, such as a spectral image and a RGB image.

That is, in the spectral imaging device according to an example of the present application, the data processing unit includes a client terminal. The client terminal includes a control module for controlling the image sensor and a display module for displaying the at least two spectral images.

Also, in the above spectral imaging device, the data processing unit includes a server. The server includes a control unit and a processing unit. The control unit is configured to control the processing unit to select a corresponding image restoring algorithm to process the output signal of the image sensor. The processing unit is configured to process the output signal of the image sensor to obtain the data of the at least two spectral images such as spectral image data and RGB image data. The spectral image data and the RGB image data are displayed as a corresponding spectral image and RGB image through the display module.

Therefore, in the spectral imaging device according to an example of the present application, the corresponding spectral image and RGB image are derived from the same frame of the same data source, and thus displayed scenes thereby are completely consistent in time and space, without any deviation in theory.

In an example of the present application, the spectral imaging device may output a plurality of spectral images simultaneously, and the number of channels of each spectral image is also not constant. That is, the number of output spectral images may be greater than or equal to two, and the number of spectral image channels of each spectral image may be greater than or equal to one. Here, the case of a single channel may be understood to mean that a grayscale map of a corresponding band is output, and in order to better reflect the advantages of spectral imaging, the number of channels corresponding to the spectral image is generally greater than or equal to three.

Therefore, in the spectral imaging device according to an example of the present application, the number of the spectral images is greater than or equal to two, and the number of spectral image channels of each spectral image is greater than or equal to one.

Furthermore, in the above spectral imaging device, the number of spectral image channels of each spectral image is greater than or equal to three.

Further, in the process of spectral imaging, a spatial resolution is the resolving power of the spectral imaging device to objects at a short spatial distance, which is embodied in the number of effective spectral pixels of the spectral image. A temporal resolution depends on a minimum time interval for continuous spectral image capturing. The temporal resolution is inversely proportional to the computation amount of image reconstruction when the hardware computation is constant. A spectral resolution is a minimum interval of wavelengths that can be resolved by the spectral imaging device. The spatial resolution, the temporal resolution and the spectral resolution are mutually restricted. In an example of the present application, the three resolutions may be adjusted by adjusting the size and step length of a sliding window to meet the requirements. For example, the amount of data used to reconstruct each spectral pixel is increased by enlarging the sliding window, so that the spectral resolution can be effectively improved. However, since the computation amount required will also be increased, the temporal resolution will be reduced. Also, since the number of photosensitive units on the image sensor is limited, the spatial resolution will be reduced by an over-sized sliding window. For another example, the spectral resolution will not be affected even if the step length of the sliding window is increased, but the increase of the step length will directly result in the reduction of a spectral pixel value of the spectral image, thus reducing the spatial resolution. Meanwhile, the temporal resolution can be improved since fewer spectral pixels need to be reconstructed. It should be noted that in the case where a plurality of spectral images are simultaneously output, the spatial resolution corresponding to each spectral image may be the same or different. It should be noted that the sliding window may be of a regular shape, e.g. a matrix of n*m, or may be of an irregular shape depending on requirements or on edge conditions.

Therefore, the spectral imaging device according to an example of the present application further includes: a sliding window unit for adjusting a spatial resolution, a temporal resolution and a spectral resolution of the spectral imaging device by adjusting the size and step length of the sliding window.

Hereinafter, spectral restoring by the data processing unit will be described.

First, the principle of spectral imaging is described. Intensity signals of incident light at different wavelengths $\lambda$ are denoted as $x(\lambda)$. A transmission spectrum curve of the filter is denoted as $T(\lambda)$. There are m groups of filter structures on the filter, having transmission spectra different from each other, and also referred to as "structural units", which may be integrally denoted as $T_i(\lambda)$ (i=1, 2, 3, ..., m).

Each group of filter structures has a corresponding physical pixel below to detect a response light intensity bi of the image sensor to light modulated by the filter structures. In a specific example of the present application, one physical pixel corresponding to a group of structural units is described as an example, but the present invention is not limited thereto. In other examples, a group of structural units correspond to a plurality of physical pixels in one group.

The relationship between a spectral distribution of the incident light and a measured value of the image sensor may be represented by the following formula:

$$bi=\Sigma(x(\lambda) \cdot Ti(\lambda) \cdot R(\lambda))$$

where $R(\lambda)$ is a response of the image sensor, denoted as:

$$Ai(\lambda)=Ti(\lambda) \cdot R(\lambda)$$

Then the above formula may be expanded to a matrix form:

$$\begin{pmatrix} b_1 \\ b_2 \\ \vdots \\ b_m \end{pmatrix} = \begin{pmatrix} A_{11} & A_{12} & \cdots & A_{1n} \\ A_{21} & A_{22} & \cdots & A_{2n} \\ \vdots & \vdots & \ddots & \vdots \\ A_{m1} & A_{m2} & \cdots & A_{mn} \end{pmatrix} \begin{pmatrix} x_1 \\ x_2 \\ \vdots \\ x_n \end{pmatrix}$$

where $bi (i=1, 2, 3, \ldots, m)$ is a response of the image sensor after light to be measured passes through a broadband filter unit, respectively corresponding to light intensity measured values of m image sensors and also referred to as m "physical pixels". It is a vector having a length of m. A is a light response of the system to different wavelengths, determined by two factors: the transmittance of the filter structure and the quantum efficiency of the response of the image sensor. A is a matrix, and each row vector corresponds to the response of a broadband filter unit to incident light of different wavelengths. Here, the incident light is discretely and uniformly sampled. There are a total of n sampling points. The number of columns of A is the same as the number of sampling points of the incident light. Here, $x(\lambda)$ is the light intensity of the incident light at different wavelengths $\lambda$, i.e. the spectrum of incident light to be measured.

In practical applications, the response parameter A of the system is known. A spectrum $f$ of input light may be obtained through a light intensity reading I of the image sensor using algorithm back-deduction. The process thereof may use different data processing modes according to specific situations, including but not limited to: least square, pseudo-inverse, equalization, least 2-norm, artificial neural network, etc.

The above example where one physical pixel corresponds to a group of structural units describes how to restore spectral information using m groups of physical pixels (i.e. pixel points on the image sensor) and m groups of structural units corresponding thereto (the same structure on the modulation layer is defined as structural units), also referred to as "spectral pixels". It should be noted that in an example of the present application, it is also possible that a plurality of physical pixels correspond to a group of structural units. It may be further defined that a group of structural units and the corresponding at least one physical pixel constitute a unit pixel, and at least one unit pixel constitutes one of the spectral pixels in principle.

On the basis of the above, when the spectral pixels are arrayed, a snapshot-type spectral imaging device may be realized.

Figure 4:
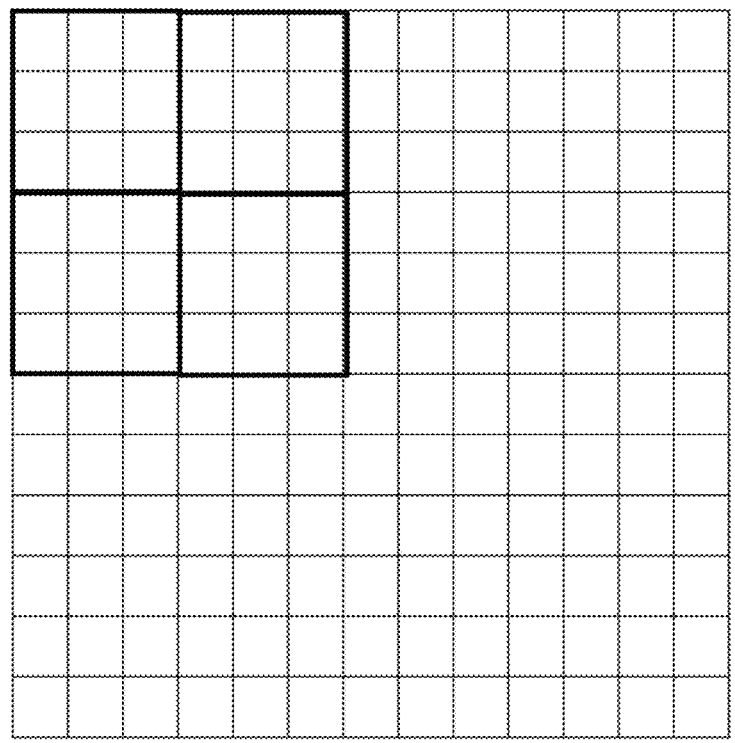
FIG. 4 illustrates a schematic diagram of a first example of pixel arrangement of an image sensor according to an example of the present application.

FIG. 4 illustrates a schematic diagram of a first example of pixel arrangement of an image sensor according to an example of the present application.

As shown in FIG. 4, an image sensor of 1896*1200 pixels (FIG. 4 shows a partial region of the image sensor) is adopted, and m=4. That is, 4*4 unit pixels are selected to form one spectrum pixel. At this moment, the size of the sliding window is 4*4 unit pixels. Then 474*300 spectrum pixels independent from each other may be achieved. Each spectrum pixel may separately compute a spectrum result by the above method. After this image sensor is matched with a lens group and other components, snapshot-type spectral imaging may be performed on an object to be measured, so that spectral information of each point of the object to be measured may be obtained after a single exposure.

Figure 5:
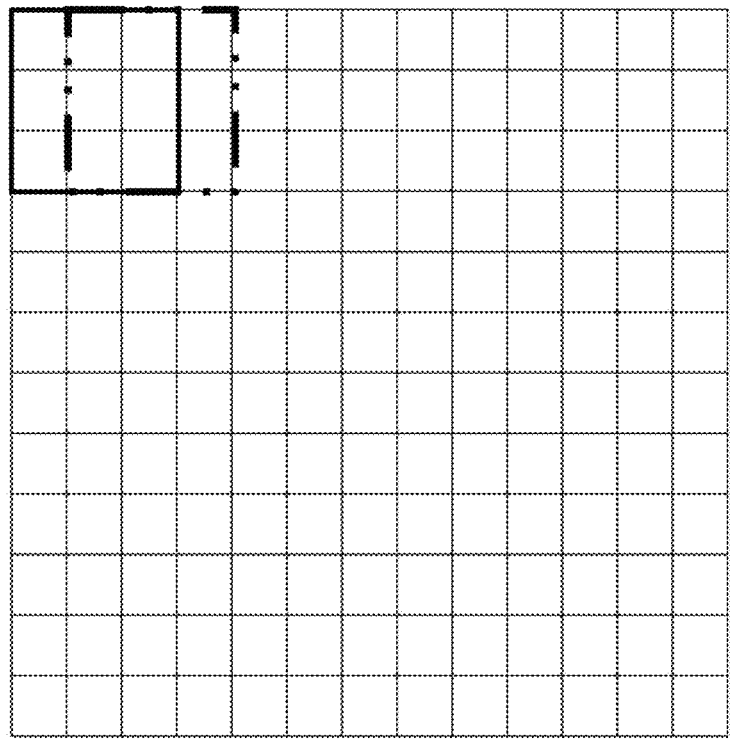
FIG. 5 illustrates a schematic diagram of a second example of pixel arrangement of an image sensor according to an example of the present application.

On this basis, selection of spectral pixels may be rearranged according to actual requirements without any adjustment of the image sensor, so as to improve the spatial resolution. As shown in FIG. 5, solid and dashed boxes may be arranged densely, i.e. the sliding window is implemented as 3*3 with a step length of 1, and the spatial resolution in the above example is improved from 474*300 to approximately 1896*1200. FIG. 5 illustrates a schematic diagram of a second example of pixel arrangement of an image sensor according to an example of the present application.

Further, for the same image sensor, the spatial resolution and the spectral resolution may be rearranged according to requirements. For example, in the above example, when the spectral resolution is highly required, 8*8 unit pixels may be used to form a sliding window to construct one spectral pixel. When the spatial resolution is highly required, 3*3 physical pixels may be used to form a sliding window to construct one spectral pixel. That is, the operation kernel is reduced.

Hereinafter, specific examples of the data processing unit restoring a spectral image and a RGB image will be described in detail.

In a first example, a spectral imaging device according to an example of the present application may perform processing in parallel through a first image restoring algorithm for spectral image restoring and a second image restoring algorithm for RGB image restoring. That is, output signals of an image sensor may be processed separately using different algorithms to restore a spectral image and a RGB image.

Specifically, an eight-channel spectral image and a RGB image (three-channel spectral image) are taken as an example. After acquiring an output signal of the image sensor, the spectral imaging device may respectively process the output signal by an eight-channel spectral image restoring algorithm and a RGB image restoring algorithm which are selected and recorded in a processing unit by the control unit of the server, so as to obtain eight-channel spectral image data and RGB image data. Then the generated image data is displayed through the display module of the client terminal. That is, the display module will display the eight-channel spectral image (e.g. using eight grayscale maps) and the RGB image. As described above, the display module and the imaging module may be integrated or may be separated. That is, the image data may be directly presented on the imaging module through the display module. It is also possible to present the image data by transmission to an individual device with a display module. It should be noted that outputting data processed by the processing unit may be outputting the data separately, e.g. outputting and displaying three-channel RGB image data and eight-channel spectral image data separately. Alternatively, the data is synthesized into eleven channels and output together, and then the client terminal selects to output three-channel RGB image data and eight-channel spectral image data.

In this way, in an example of the present application, the restoring processes of the spectral image and the RGB image may be independent of each other, and the images may be computed in parallel using different hardware (or using different computation modules of the same hardware).

Also, in this case, the RGB image may be restored based on standard color standards such as CIE1931, CIE1976 and sRGB, thereby achieving a high-fidelity true color, instead of being obtained via multi-spectral image conversion.

Therefore, in the spectral imaging device according to an example of the present application, the data processing unit obtains the spectral image data and the RGB image data using a first multi-spectral image restoring algorithm and a second RGB image restoring algorithm, respectively.

In a second example, after obtaining an output signal of the image sensor, the output signal is processed by a multi-spectral image restoring algorithm. For example, when the number of computation channels corresponding to the multi-spectral image restoring algorithm is m, spectral image data of m channels is generated. Then, the spectral image data of m channels may be segmented into spectral image data of n1 and n2 channels, and then the spectral image data of n1 and n2 channels may be presented. That is, in this example, it will be understood that the control unit controls the processing unit to select a multi-spectral image restoring algorithm for processing to obtain image data, and then outputs the data to the client.

The restoring of the eight-channel spectral image and the RGB image (three-channel spectral image) is also taken as an example. The multi-spectral image restoring algorithm directly acquires multi-spectral image data of eleven channels, and then segments the multi-spectral image data of eleven channels. The multi-spectral image data of eight channels performs eight-channel spectral image presentation, and the multi-spectral image data of the remaining three channels is corresponding image data of R, G and B channels for presenting the RGB image.

Therefore, in the spectral imaging device according to an example of the present application, the data processing unit obtains spectral image data of a first number of channels using a second multi-spectral image restoring algorithm, and divides the spectral image data of the first number of channels into spectral image data of a second number of channels and RGB image data of a third number of channels.

In a third example, there may be a common channel in the above spectral image data of n1 channels and spectral image data of n2 channels, and there may be a case where the channels are shared. In this way, the computation amount may be reduced to some extent when computing the image data, i.e. n1+n2≤m.

The restoring of the eight-channel spectral image and the RGB image (three-channel spectral image) is also taken as an example. The multi-spectral image restoring algorithm directly acquires multi-spectral image data of eight channels. The eight-channel data may directly present required eight-channel spectral images, and then three-channel image data is selected from the multi-spectral image data of eight channels (e.g. selecting R, G and B channels) for presenting the RGB image.

Therefore, in the above spectral imaging device, the sum of the second number of channels and the third number of channels is less than or equal to the first number of channels.

Exemplary Spectral Restoring Method 1

As described above, considering multi-channel spectral imaging, an imaging principle of each spectral pixel of the spectral imaging device may be expressed by the following equation:

$$AX=B$$

Here, X represents a tensor of a spectral image to be restored by an algorithm, which is generally composed of three orders: w, h and c, where w is an image width in the unit of "pixel"; h is an image height in the unit of "pixel"; and c is the number of channels of a spectral image output by the spectral imaging device (e.g., for a RGB image, c=3). Also, A is a previously calibrated spectral response tensor of the spectral imaging device, which is composed of three orders: w, h and l, where the dimension l is a calibration resolution, i.e. the number of spectral data channels of a target spectral band given by a calibration device. The tensor A characterizes the ability of a structure on a photosensitive chip (i.e. a spectral chip), such as the image sensor described above, to transmit monochromatic light of different wavelengths. A(i,j, o) represents a value of a number of an $i^{th}$ row, a $j^{th}$ column and an $o^{th}$ layer of the tensor A, i.e. the transmittance of a pixel (i,j) to the $o^{th}$ monochromatic light, and A(:,:,o) represents the transmittance of a fully photosensitive chip for the $o^{th}$ monochromatic light individually. Furthermore, B is a light energy response signal matrix given by the image sensor of the spectral imaging device, which is composed of two orders: w and h.

Therefore, in an example of the present application, spectral restoring is solving F under the condition that A is known, whereby:

$$\mathrm{argmin}[E(X,F(B))]$$

where E represents a certain error function, a structural similarity (SSIM) is usually used as a function of error measurement in image processing, and F(B) is a spectral restoring function.

In order to obtain a spectral image tensor X by means of a spectral restoring method, in an example of the present application, a new concept "standard spectrum" in the field of spectral restoring is introduced and denoted as s having a dimension of l, and a standard spectrum corresponding to a $k^{th}$ channel is $s_k$, i.e. a standard spectrum vector. Also, the standard spectrum vector is superimposed as a column vector to form a matrix S, which is composed of two orders: l and c. In the spectral imaging device, each channel X(:,:,k) of X corresponds to a standard spectrum $s_k$.

Figure 6:
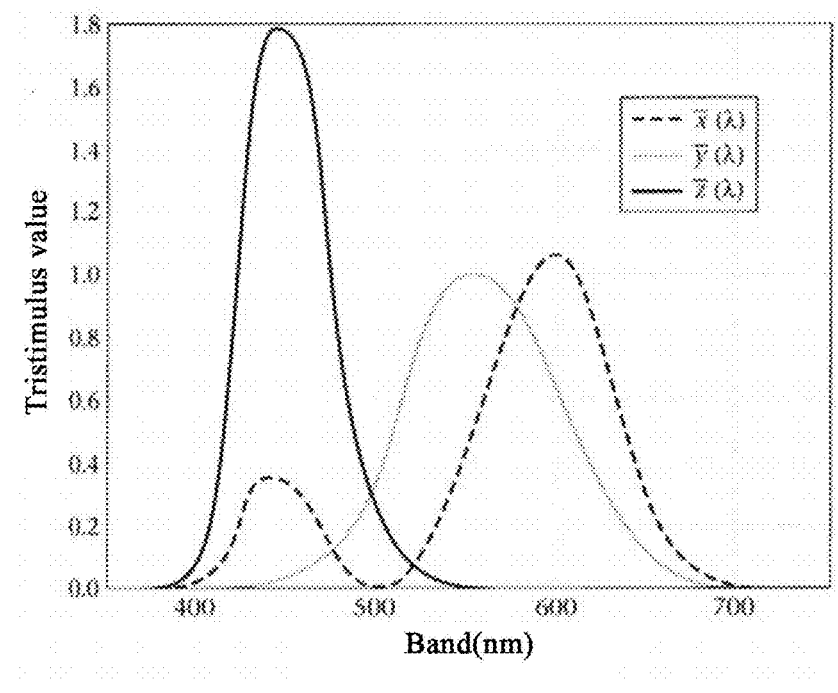
FIG. 6 illustrates a schematic diagram of a standard spectrum for establishing a RGB gamut in a spectral restoring method to which a spectral imaging device is applied according to an example of the present application.

Here, FIG. 6 illustrates a schematic diagram of a standard spectrum for establishing a RGB gamut in a spectral restoring method to which a spectral imaging device is applied according to an example of the present application.

As shown in FIG. 6, a curve (i.e. a tristimulus value curve, which may also be written as X, Y, Z) of $\bar{r}(\lambda)$, $\bar{g}(\lambda)$ and $\bar{b}(\lambda)$ with reference to a CIE 1931 standard is shown.

Assuming that an observation range of a spectrum in an observation matrix is α-β nm and an observation accuracy is δ nm, the standard spectrum has $$1 = \left\lfloor \frac{(\beta - \alpha)}{\delta} \right\rfloor + 1$$

elements. Therefore, three standard spectra may be computed as follows:

$s_r(j)=\bar{r}(\lambda), j\in[1,l]$ $s_g(j)=\bar{g}(\lambda), j\in[1,l]$ $s_b(j)=\bar{b}(\lambda), j\in[1,l]$ where $\lambda=\alpha+\delta(j-1)$.

It should be noted that the establishment of standard spectra needs to satisfy:

$\forall i,j\in[0,n], \Sigma s_i=\Sigma s_j$ $\|s\|_2=1$

In addition, a spectral image true value tensor received by the spectral imaging device is denoted as O, which is composed of three orders: w, h and l and characterizes a spectrum corresponding to initial incident light on each physical pixel, then:

$X(i,j,k) \rightarrow O(i,j)s_k$ where $X(i,j,k)$ may also be denoted as $x_k$, generally referring to as a spectral image value of a $k^{th}$ channel of a certain spectral pixel, i.e. $x_k=X(i,j,k)$, where i and j are also generally referred to. Also, $O(i,j)$ generally refers to a spectral curve true value tensor of a certain spectral pixel. Here, i and j are also generally referred to. The symbol "$\rightarrow$" means as close as possible, and means that a Euclidean distance is as small as possible if used between tensors.

As described above, the acquisition of X requires the aid of a spectral restoring function, i.e.:

$F(B)=X$

Therefore:

$F(B)\rightarrow OS$

Based on this, the purpose of the spectral restoring method according to an example of the present application is converted to solving a function F such that:

$\|F(B)-OS\|_2 \rightarrow 0$

Specifically, as described above, a main functional structure of the spectral imaging device according to an example of the present application is a photosensitive chip (i.e. spectral chip) covered with a modulation layer. The photosensitive chip has w photosensitive units in width and h photosensitive units in height. Each photosensitive unit may independently respond to light irradiation. It can be assumed that the response of the photosensitive units to light is linearly related to light energy. The photosensitive chip is covered with a modulation layer composed of various structures, and is defined as a spectrum chip. This modulation layer enables different photosensitive units on the photosensitive chip to have different responses to light of the same energy but different spectra, and the change in this response is determined by A, i.e.:

$$B = \sum_{l=1}^{L}(A*O)$$

The meaning of the above equation is the accumulation of tensors A*O over order l. Here, * represents a generalized multiplication which takes the smallest tensor order from tensor to tensor and performs element-by-element multiplication, and a broadcast strategy is used for element-by-element multiplication for higher orders.

Here, the tensor A is determined by the modulation layer on the photosensitive chip, and A(i,j) is a transmission spectrum on a photosensitive unit (i,j). Hereinafter, the term "physical pixel" is used to refer to a minimum imaging unit on the photosensitive chip. The photosensitive chip may be constituted by one or more physical pixels. In the present invention, one-to-one is preferred as an example.

In a multi-spectral image X finally output by the spectral restoring method according to an example of the present application, each X(i,j) is defined as a "spectral pixel". As the name implies, the spectral pixel is a geometric pixel in the multi-spectral image. Further, it will be understood that the modulation layer has at least one modulation unit. The modulation unit corresponds to at least one physical pixel. The modulation unit and the physical pixel constitute structural pixels. At least one structural pixel constitutes one of the spectral pixels. Each modulation unit has a corresponding transmission spectrum curve. That is, the transmission spectrum curve is determined by the modulation unit. The transmission spectrum curve further constitutes a transmission spectrum tensor A. It should be noted that the transmission spectrum tensor A may be acquired by calibration, may also be deduced by computation, and may also be acquired by other methods. Further, the spectral chip of the spectral imaging device in the present invention has at least two spectral pixels, and there are at least two spectral pixels having different corresponding structures or light modulation effects. X(i,j,k) is the value of a certain channel in a certain spectral pixel, and may be defined as a "primitive". The primitive is a minimum element required by the spectral restoring method according to an example of the present application. The restoring operation of each primitive corresponds to a thread in parallel computation.

In order to obtain the value of the primitive, it is necessary to use the value of a physical pixel corresponding thereto and the value of a physical pixel in the vicinity thereof, i.e.:

$X(i,j,k)=f_{i,j,k}(B(i-p:i+p,j-p:j+p))=f_{i,j,k}(\hat{b}_{i,j,k})$ where the selection of p is determined according to the actual situation. $f_{i,j,k}$ is defined as a primitive restoring function. Once $f_{i,j,k}$ is determined, the function F described above may be determined, and spectral restoring may be achieved. Therefore, hereinafter, f will be used to represent $f_{i,j,k}$ generally referring to a certain channel of a certain spectral pixel, and $\hat{b}$ will be used to represent a photosensitive chip response signal vector corresponding to a certain spectral pixel generally referred to. That is, $\hat{b}_{i,j}$ is a photosensitive chip response signal vector for determining a certain spectral pixel, which is B(i−p:i+p,j−p:j+p) transformed into a vector and may be represented by $\hat{b}$ when generally referring to a certain spectral pixel. Therefore, the above formula is used to solve f, satisfying:

$f(\hat{b})=x(k)$

The function $f$ may be of any derivable form, when it is a linear function, the function is of the following form:

$f_k(\hat{b})=c_k\cdot\hat{b}$

Here, in the spectral restoring method according to an example of the present application, a new concept "restoring tensor" is introduced and denoted, for example, as C, which is composed of four orders: w, h, $a^2$, and c, where a is a side length of a physical pixel array for restoring any one spectral pixel, in the unit of "pixel". Also, $c_k$ is a vector for restoring a value of a $k^{th}$ channel of a certain pixel point in a restoring tensor C, i.e. C(i,j,:,k), where i and j are generally referred to. Also, · represents a vector or matrix product, which is an inner product when used between a vector and a vector and is a matrix multiplication when used between a matrix and a matrix. If it is used between tensors with different orders, the minimum first order or second order is taken for vector inner product or matrix multiplication. A broadcast strategy is adopted for higher orders.

As described above, in the spectral imaging device, each channel $X(:,:,k)$ of X corresponds to a standard spectrum $s_k$. Under the premise that the total light energy is maintained as unit energy, if an actual spectrum $O(i,j,*)$ received by the spectral imaging device on a certain spectral pixel $(i,j)$ is completely consistent with a standard spectrum corresponding to a channel k, a spectral pixel value of a corresponding channel of an image output by the imaging device should be 1. Certainly, it will be understood by those skilled in the art that the spectral pixel value is not limited to 1 and may be other constants. In this way, the following constraint equation (1) is obtained:

$$c_k \cdot (\hat{A} s_k) = c_k \hat{A} s_k = 1$$

Here, $\hat{A}$ is a spectral response tensor block $A(i-p:i+p, j-p:j+p,:)$ for restoring $X_{i,j}$, first and second orders of the tensor block are rearranged to the same order to form a matrix in the shape of $(a^2, l)$, and each pixel $(i,j)$ is defined as $\hat{A}_{i,j}$.

It will be understood that the standard spectrum is one filter on each channel as a standard, and that the value on the channel should be 1 when an actual spectrum coincides completely with a transmission spectrum of the filter. This standard spectrum may be a Gaussian filter with a certain peak width centered at a specific wavelength, and may also be of any shape defined (e.g. RGB tristimulus values).

In addition, the response should be as small as possible for spectra other than $s_k$. Therefore, a constraint equation (2) is obtained:

$$\Sigma(c_k \cdot (\hat{A} \times 1)) = c_k \hat{A} e \to 0$$

where e is a vector with all elements being 1.

Furthermore, in order to prevent over-fitting, a parameter vector $c_k$ may also be constrained using a Tikhonov method to obtain a constraint equation (3):

$$\lambda \|(D c_k)\|_2 \to 0$$

where D is a Tikhonov matrix, which is a diagonal matrix. In general, it may be taken as a unit matrix, and λ is a Lagrange multiplier of a regular term. Also, λ may also be set to 0 if it is not necessary to prevent over-fitting.

The value of $c_k$ may be obtained by solving the above three equations using a solver.

In consideration of the problem that the computational speed of the solver is limited, in the spectral restoring method according to an example of the present application, it is preferable to propose an efficient method to solve the above system of equations, i.e. to integrate three constraint equations into one equation:

$$g(c_k) = (c_k \hat{A} e)^2 + \lambda \|D c_k\|_2^2 + \alpha (c_k \hat{A} s_k - 1)^2 \to 0$$

where in order for the constraint equation (1) to also be added to g, a sensitivity multiplier α is introduced to characterize the requirement of spectral restoring sensitivity. As α is higher, the sensitivity is higher, but the corresponding model robustness and spectral accuracy will be reduced. Therefore, α needs to be confirmed in practical application. The determination methods of α include, but are not limited to, training from known spectral data sets using a leave-one-out strategy; or empirically setting according to known error conditions of calibration data and actual requirements, etc.

Also, as described above, the integrated constraint equation may include only the first constraint equation and the second constraint equation as described above in the case of λ=0.

In order to make $g(c_k)$ as small as possible, zeroing should be performed after derivation, i.e.:

$$g'(c_k) = 0$$

In order to facilitate computation, the integrated formula may be adjusted to:

$$g(c_k) = (c_k \hat{A} e)^2 + \lambda \|D c_k\|_2^2 + \alpha (c_k \hat{A} s_k - 1)^2 \to 0$$

The equation is solved to obtain an algorithm of $c_k$:

$$c_k = \alpha (\hat{A}^T e^T e \hat{A} + \lambda D^T D + \alpha s_k^T \hat{A}^T \hat{A} s_k)^{-1} \cdot \hat{A} s_k$$

The algorithm is expanded to the entire image to obtain:

$$C(i,j,:,k) = \alpha (\hat{A}_{i,j}^T \hat{A}_{i,j} + \lambda D^T D + \alpha s_k^T \hat{A}_{i,j}^T \hat{A}_{i,j} s_k)^{-1} \cdot \hat{A}_{i,j} s_k$$

A restoring matrix C is finally obtained, and then a hyper-spectral image may be obtained using the following formula:

$$X(i,j) = C(i,j) \hat{b}_{i,j}$$

The spectral restoring method according to an example of the present application has the advantages of high speed, easy parallel operation, high restoring accuracy, etc., and is feasible as a spectral imaging restoring algorithm.

In a modified example, it is considered that the constraint equation (2) would be stricter in the following form, but model fitting would also be more difficult:

$$\|(c_k \cdot (\hat{A} \times 1)\|_2 = \|c_k \hat{A}\|_2 \to 0$$

Then a final constraint equation is:

$$g(c_k) = \|c_k \hat{A}\|_2^2 + \lambda \|c_k D\|_2^2 + \alpha (c_k \hat{A} s_k - 1)^2 \to 0$$

Derivation with zero derivatives is performed:

$$g'(c_k) = 0$$

In order to facilitate computation, the constraint equation is modulated $$g(c_k) = \|c_k \hat{A}\|_2^2 + \lambda \|c_k D\|_2^2 + \alpha (c_k \hat{A} s_k - 1)^2 \to 0$$

to solve:

$$c_k = \alpha (\hat{A}^T \hat{A} + \lambda D^T D + \alpha s_k^T \hat{A}^T \hat{A} s_k)^{-1} \cdot \hat{A} s_k$$

Figure 7:
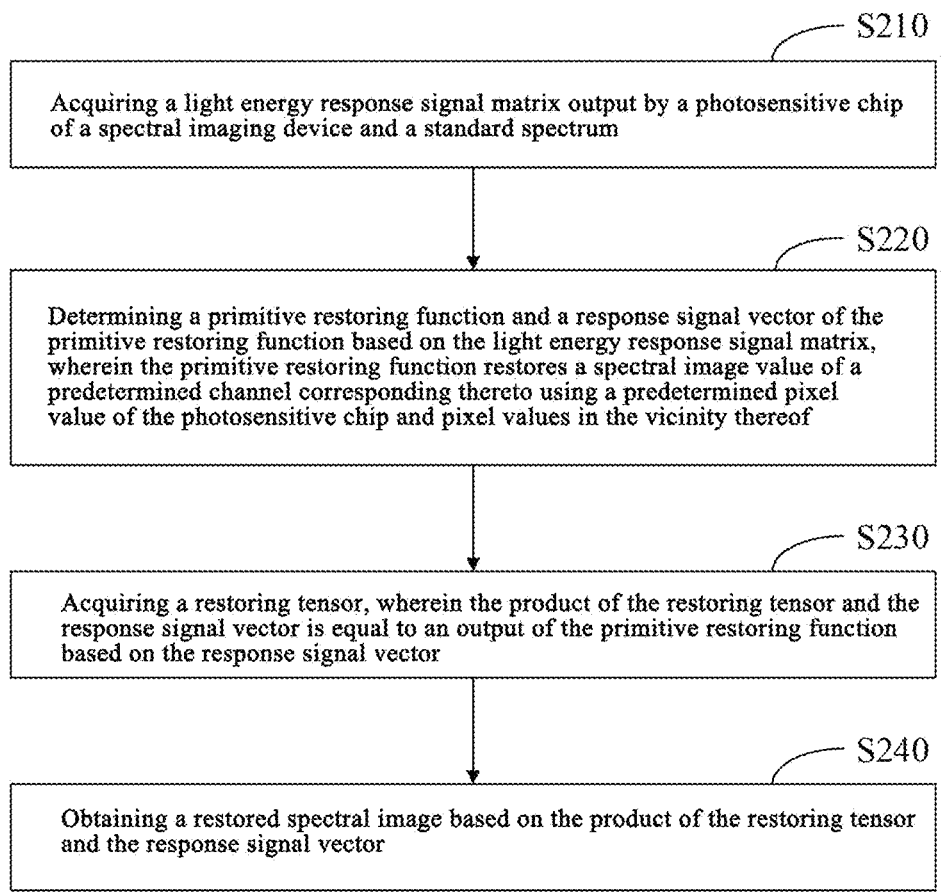
FIG. 7 illustrates a flow chart of a first example of a spectral restoring method according to an example of the present application.

FIG. 7 illustrates a flow chart of a first example of a spectral restoring method according to an example of the present application.

As shown in FIG. 7, a first example of a spectral restoring method according to an example of the present application includes the following steps.

Step S210: acquire a light energy response signal matrix and a standard spectrum output by a photosensitive chip of a spectral imaging device.

That is, the light energy response signal matrix B as described above is obtained, and B includes two dimensions: an image width w and an image height h.

That is, in the spectral restoring method according to an example of the present application, the light energy response signal matrix is represented as a matrix B including two dimensions: an image width w and an image height h.

Also, the dimension of the standard spectrum is the same as the number of calibration resolutions of a spectral response tensor of the pre-calibrated spectral imaging device, i.e. l. The standard spectrum is configured so that a distance from the product of a spectral image true value tensor received by the spectral imaging device and the standard spectrum to a spectral image tensor to be restored is minimum, i.e.:

$$X(i,j,k) \rightarrow O(i,j)s_k$$

Here, the standard spectrum is denoted as s, and a standard spectrum corresponding to a $k^{th}$ channel is denoted as $s_k$. $X(i,j,k)$ may also be denoted as $x_k$, generally referring to as a spectral image value of the $k^{th}$ channel of a certain spectral pixel, i.e. $x_k = X(i,j,k)$, where i and j are also generally referred to. Also, $O(i,j)$ generally refers to a spectral image true value tensor of a certain spectral pixel. Here, i and j are also generally referred to. The symbol "$\rightarrow$" means as close as possible, and means that a Euclidean distance is as small as possible if used between tensors.

That is, in the spectral restoring method according to an example of the present application, the standard spectrum is represented as s, and a channel standard spectrum corresponding to a $k^{th}$ channel of the standard spectrum is represented as $s_k$, whereby:

$$x_k \rightarrow O(i,j)s_k$$

where $x_k$ is a spectral image value of the $k^{th}$ channel of a certain pixel, $O(i,j)$ is a spectral image true value tensor of a certain pixel, and $\rightarrow$ represents that a Euclidean distance between tensors is minimum.

Step S220: determine a primitive restoring function and a response signal vector of the primitive restoring function based on the light energy response signal matrix, the primitive restoring function restoring a spectral image value of a predetermined channel corresponding thereto using a predetermined pixel value of the photosensitive chip and pixel values in the vicinity thereof. That is, based on the formula as described above:

$$X(i,j,k) = f_{i,j,k}(B(i-p:i+p, j-p:j+p)) = f_{i,j,k}(\hat{b}_{i,j})$$

a response signal vector $\hat{b}$ is obtained.

That is, in the spectral restoring method according to an example of the present application, the primitive restoring function uses pixel values at a distance of a predetermined threshold from the predetermined pixel in width and height, and a response signal vector of the predetermined pixel is denoted as $\hat{b}$.

Step S230: acquire a restoring tensor, the product of the restoring tensor and the response signal vector being equal to an output of the primitive restoring function based on the response signal vector.

That is, in the spectral restoring method according to an example of the present application, the restoring tensor is denoted as C, and a channel restoring vector for restoring a value of the $k^{th}$ channel of the predetermined pixel in the restoring tensor is denoted as $c_k$, then:

$$f_k(\hat{b}) = c_k \cdot \hat{b}$$

where $f_k(\hat{b})$ is an output of the primitive restoring function based on the response signal vector $\hat{b}$.

Step S240: obtain a restored spectral image based on the product of the restoring tensor and the response signal vector.

That is, in the spectral restoring method according to an example of the present application, pixels of the spectral image are:

$$X(i,j) = C(i,j)\hat{b}_{i,j}$$

As described above, in an example of the present application, the restoring tensor may be solved by establishing a constraint equation, and the specific process includes: establishing a first constraint equation based on the restoring tensor, a spectral response tensor block of the spectral response tensor of the spectral imaging device corresponding to the primitive restoring function, and the standard spectrum; establishing a second constraint equation based on the restoring tensor and the spectral response tensor block; and obtaining the restoring tensor based on the first constraint equation and the second constraint equation.

The first constraint equation is the constraint equation (1) as described above:

$$c_k \cdot (\hat{A}s_k) = c_k \hat{A} s_k = 1$$

where $\hat{A}$ is a spectral response tensor block $A(i-p:i+p, j-p:j+p,:)$ for restoring $X_{i,j}$, first and second orders of the tensor block are rearranged to the same order to form a matrix in the shape of $(a^2, l)$, and each pixel $(i,j)$ is defined as $\hat{A}_{i,j}$.

Therefore, in the spectral restoring method according to an example of the present application, the first constraint equation is that the product of the channel restoring vector $c_k$, a spectral response tensor block $\hat{A}$ corresponding to the primitive restoring function in the spectral response tensor, and the channel standard spectrum $s_k$ is equal to one.

Also, the second constraint equation is the constraint equation (2) as described above:

$$\Sigma(c_k \cdot (\hat{A} \times 1)) = c_k \hat{A}e \rightarrow 0$$

where e is a vector with all elements being 1, i.e. a unit vector.

Therefore, in the spectral restoring method according to an example of the present application, the second constraint equation is that the product of the channel restoring vector $c_k$, a spectral response tensor block $\hat{A}$ corresponding to the primitive restoring function in the spectral response tensor, and a unit vector is constrained to 0.

In this way, the restoring tensor is obtained based on the first constraint equation and the second constraint equation.

Also, as described above, preferably, in the spectral restoring method according to an example of the present application, the solution may be performed by integrating the first constraint equation and the second constraint equation.

Furthermore, preferably, when solving the restoring tensor, the restoring tensor is further constrained for preventing over-fitting to obtain a third constraint equation.

The third constraint equation is the constraint equation (3) as described above:

$$\lambda \|(Dc_k)\|_2 \rightarrow 0$$

Therefore, in the spectral restoring method according to an example of the present application, the third constraint equation is that the product of a 2-norm of the product of a Tikhonov matrix and the channel restoring vector $c_k$ and a Lagrange multiplier $\lambda$ of a regular term is constrained to 0.

In this way, obtaining the restoring tensor based on the first constraint equation and the second constraint equation includes: solving the first constraint equation, the second constraint equation and the third constraint equation to obtain the restoring tensor.

Specifically, the first constraint equation is first multiplied by a sensitivity coefficient, and the product is then added to the second constraint equation and the third constraint equation to obtain a combination equation. The channel restoring vector is then obtained by zeroing derivatives of the combination equation. Finally, the above steps are iteratively repeated to obtain the entire restoring tensor.

Therefore, in the spectral restoring method according to an example of the present application, the step of solving the first constraint equation, the second constraint equation and the third constraint equation to obtain the restoring tensor includes the following operations:

The first constraint equation is multiplied by a sensitivity coefficient, and the product is added to the second constraint equation and the third constraint equation to obtain a combination equation, represented as:

$$g(c_k)=(c_k\hat{A}e)^2+\lambda\|Dc_k\|_2^2+\alpha(c_k\hat{A}s_k-1)^2\to 0$$

The combination equation is derived and zeroed, represented as:

$$g'(c_k)=0$$

The channel restoring vector is obtained as:

$$c_k=\alpha(\hat{A}^Te^Te\hat{A}+\lambda D^TD+\alpha s_k^T\hat{A}^T\hat{A}s_k)^{-1}\cdot\hat{A}s_k$$

The above steps are iterated to obtain the entire restoring tensor as:

$$C(i,j,:,k)=\alpha(\hat{A}_{i,j}{}^T\hat{A}_{i,j}+\lambda D^TD+\alpha s_k^T\hat{A}_{i,j}{}^T\hat{A}_{i,j}s_k)^{-1}\cdot\hat{A}_{i,j}s_k$$

Also, in a modified example, the second constraint equation is that a 2-norm of the product of the channel restoring vector $c_k$ and a spectral response tensor block $\hat{A}$ corresponding to the primitive restoring function in the spectral response tensor is constrained to 0, represented as:

$$\|c_k\hat{A}\|_2\to 0$$

Then, the first constraint equation is multiplied by a sensitivity coefficient, and the product is added to the second constraint equation and the third constraint equation to obtain a combination equation, represented as:

$$g(c_k)=\|c_k\hat{A}\|_2^2+\lambda\|c_kD\|_2^2+\alpha(c_k\hat{A}s_k-1)^2\to 0$$

The channel restoring vector is obtained as:

$$c_k=\alpha(\hat{A}^T\hat{A}+\lambda D^TD+\alpha s_k^T\hat{A}^T\hat{A}s_k)^{-1}\cdot\hat{A}s_k$$

Here, it can be seen that the value of the channel restoring vector is a value based on the spectral response tensor block $\hat{A}$ corresponding to the primitive restoring function and the standard spectrum $s_k$. Therefore, a predetermined spectral imaging device may pre-calibrate a spectral response tensor and acquire a standard spectrum so as to determine a channel restoring vector. In this way, when performing spectral imaging, a response signal vector may be determined based on a light energy response signal matrix so as to obtain a restored spectral image.

Thus, by introducing a standard spectrum and a restoring tensor to restore a spectral image, it is possible to achieve a spectral restoring method, with high speed, easy parallel operation and high restoring accuracy, according to an example of the present application.

Further, in an example of the present application, the spectral image may also be restored based on a neural network model.

Specifically, when restoring using a neural network, i.e.:

$$f_k(\hat{b})=x(k)$$

where f is a neural network composed of a connection layer and an activation layer. In order for the neural network to obtain as much information as possible, it is necessary to further add information of a response matrix, i.e.:

$$f_k(\hat{b},\hat{A})=x(k)$$

According to the definition of the standard spectrum as described above, when a region (i−p:i+p,j−p:j+p) covered by $\hat{b}$ and $\hat{A}$ is fully illuminated by light with a spectrum $s_k$, $f_k(\hat{b},\hat{A})=1$, i.e. the first constraint equation is:

$$f_k(\hat{b},\hat{A}s_k)=1$$

Meanwhile, considering that the error should be minimized, the second constraint equation should be satisfied:

$$f_k(\hat{b},\hat{A})\to 0$$

Furthermore, it is no longer possible to use regular terms to control the over-fitting of the neural network. Therefore, a noise factor $\hat{N}$ is introduced to enhance the data, so as to obtain a third constraint equation:

$$f_k(N*\hat{b},\hat{A}s_k)\to 1$$

$$f_k(N*\hat{b},\hat{A})\to 0$$

Here, N represents a noise factor and is a random number matrix in the shape of (a, a), which is expected to be 0 and obeys a Gaussian distribution. As an element is farther away from the center of a matrix, the variance of a random number is larger. The specific parameters may be selected according to the actual situation of training.

In addition, other common data enhancement methods may be used to control the over-fitting of the model. However, using only these two constraints is not sufficient to effectively learn a more complex neural network model. Therefore, in an example of the present application, data in a hyper-spectral database may be used for further training the model, i.e. establishing a fourth constraint equation:

$$f_k(N*\hat{b},\hat{A}t)\to t\cdot s_k$$

where t is a spectral image true value.

Based on the above constraint equations, a data set is made to train f so as to achieve spectral imaging restoring. In an example of the present application, the neural network includes, but is not limited to: a fully connected (FC) neural network, a convolutional neural network (CNN), a recurrent neural network (RNN), ResNet, an attention neural network, a transformer(transformer neural network), and variations thereof, etc.

That is, in the spectral restoring method according to an example of the present application, the first constraint equation is represented as:

$$f_k(\hat{b},\hat{A}s_k)=1$$

where $f_k$ is a neural network composed of a connection layer and an activation layer.

Also, in the above spectral restoring method, the second constraint equation is represented as:

$$f_k(\hat{b},\hat{A})\to 0$$

Also, in the above spectral restoring method, obtaining the restoring tensor based on the first constraint equation and the second constraint equation includes: obtaining the restoring tensor based on the first constraint equation, the second constraint equation and the third constraint equation. The third constraint equation is represented as:

$$f_k(N*\hat{b},\hat{A}s_k)\to 1$$

$$f_k(N*\hat{b},\hat{A})\to 0$$

where N is a noise factor and is a random number matrix in the shape of (a, a), which is expected to be 0 and obeys a Gaussian distribution.

Furthermore, the above spectral restoring method further includes: establishing a fourth constraint equation:

$$f_k(N*\hat{b},\hat{A}t)\to t\cdot s_k$$

Accordingly, in the above spectral restoring method, solving the first constraint equation, the second constraint equation and the third constraint equation to obtain the restoring tensor includes: training the neural network based on a data set for spectral restoring by the trained neural network.

Exemplary Spectral Restoring Method 2

Figure 8:
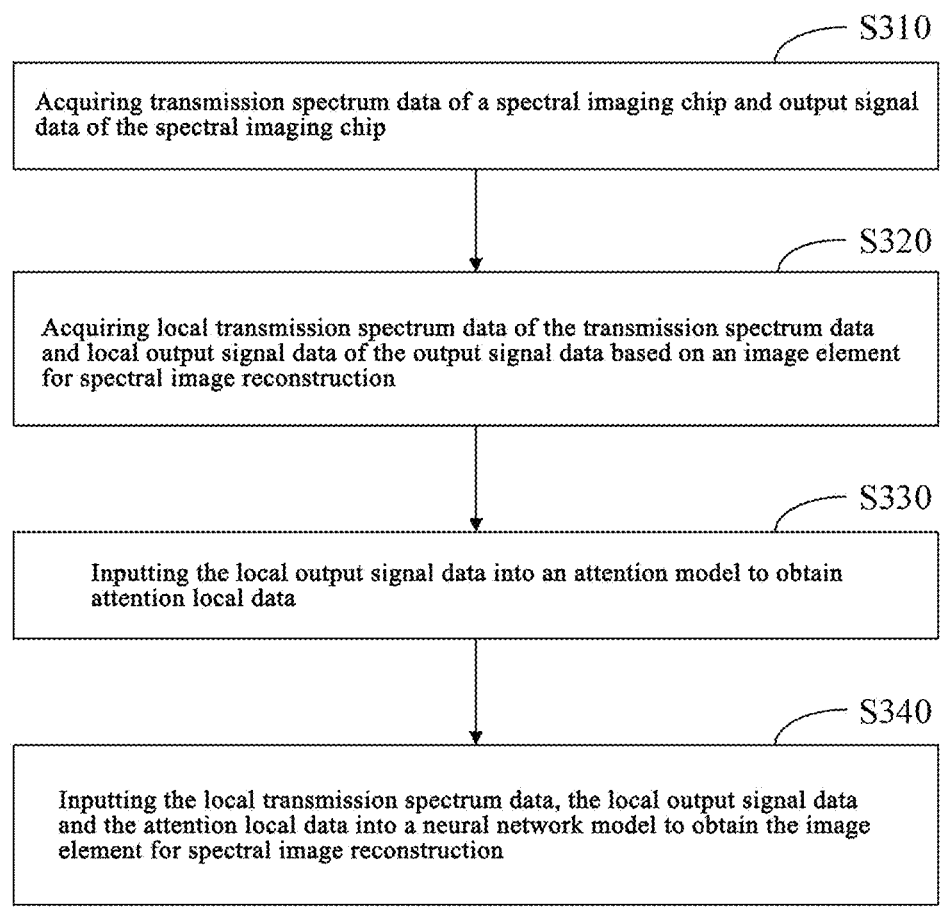
FIG. 8 illustrates a flow chart of a second example of a spectral restoring method according to an example of the present application.

FIG. 8 illustrates a schematic flow chart of a second example of a spectral restoring method according to an example of the present application.

As shown in FIG. 8, a second example of a spectral restoring method according to an example of the present application includes the following steps.

Step S310: acquire transmission spectrum data of a spectral imaging chip and output signal data of the spectral imaging chip.

Specifically, in an example of the present application, the transmission spectrum data of the spectral imaging chip (i.e. the filter and image sensor as described above) is a third-order transmission spectrum tensor, which is, for example, represented as A in the shape of (l,w,h), respectively representing a calibrated spectral resolution, width resolution and height resolution of an image. The transmission spectrum data A of the spectral imaging chip may be obtained by calibration, may also be obtained by computation, and may also be acquired by other methods. In addition, during spectral imaging, output signal data of the spectral imaging chip, e.g. light intensity data output by the image sensor, is a matrix, for example, represented as B in the shape of (w, h). Also, if a spectral image to be reconstructed is represented as X, then:

$$AX=B$$

Therefore, the purpose of the spectral restoring method according to an example of the present application is to reconstruct a spectral image from the transmission spectrum data of the spectral imaging chip and the output data thereof.

Step S320: acquire local transmission spectrum data of the transmission spectrum data and local output signal data of the output signal data based on an image element for spectral image reconstruction.

That is, in an example of the present application, the reconstruction of a spectral image is performed image element by image element. When an image element (i,j) is restored, it is necessary to take local parts of a transmission spectrum tensor A having a side length equal to a predetermined pixel such as m pixels within a nearby region and a signal data matrix B, denoted as $\hat{A}_{i,j}$ and $\hat{B}_{i,j}$. Here, in an example of the present application, in the case where it is not necessary to particularly emphasize the position of the image element, they are abbreviated as $\hat{A}_{i,j}$ and $\hat{B}_{i,j}$. Therefore, in an example of the present application, this region for reconstructing a single image element spectrum may also be referred to as a "reconstruction kernel". That is, a model proposed by an example of the present application for reconstructing a spectral image is built based on reconstruction kernels. Each reconstruction kernel reconstructs the spectrum of only one image element. If the entire spectral image is to be restored, it is sufficient to slidably apply the reconstruction kernels to the entire picture (padded with padding values if necessary).

In this way, since training data of each multi-spectral image may be divided into a plurality of pixel points for training the model, it is suitable for the case where a training data set is small.

Therefore, in the spectral restoring method according to an example of the present application, acquiring local transmission spectrum data of the transmission spectrum data and local output signal data of the output signal data based on pixels for reconstructing a spectral image includes: acquiring, based on a position of the image element for spectral image reconstruction, local transmission spectrum data of the transmission spectrum data having a side length equal to a predetermined number of pixels and local output signal data of the output signal data within a region near the position.

Step S330: input the local output signal data into an attention model to obtain attention local data. Here, prior to inputting the local output signal data, i.e. $\hat{B}$ as described above into the neural network model, an attention model is first input to enhance the recognition and filtering of boundaries by subsequent models. Also, considering that the attention model has a large demand for computation, it is preferable to further perform attention computation on $\hat{B}$ in regions, represented as:

$$\hat{I}_{ai+j}(m,n)=\hat{B}_{i,j}*\hat{B}_{m,n}$$

where a is the number of segmented sides, i and j are substantial coordinates of an attention kernel, m and n are corresponding coordinates of an attention background, i, j, m, n∈[0, a). Here, FIG. 9 illustrates a schematic implementation diagram of an attention model in a spectral restoring method according to an example of the present application.

Figure 9:
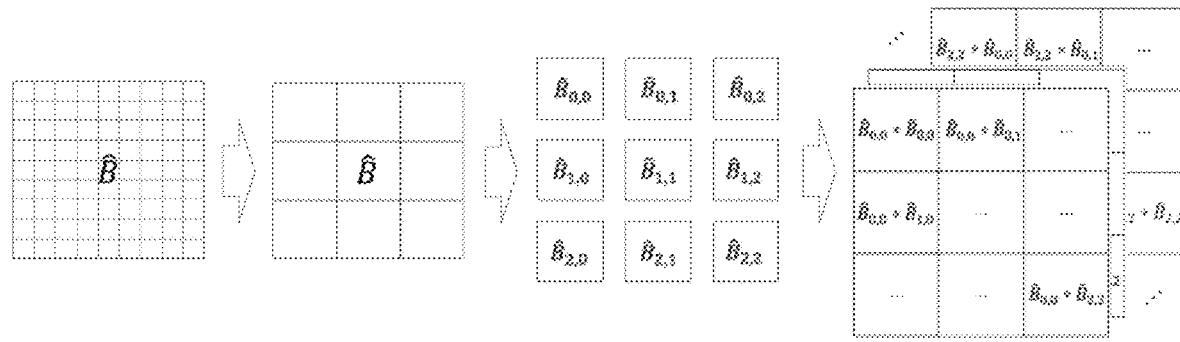
FIG. 9 illustrates a schematic implementation diagram of an attention model in a spectral restoring method according to an example of the present application.

As shown in FIG. 9, although a side length of $\hat{B}$ may have tens of pixels, it is segmented into regions of 3*3 prior to attention computation, and thus the computed attention tensor has only 9 layers. The attention model may also be referred to as a mini-attention model since less computation and storage are required. It should be noted that the segmentation of the mini-attention model is not limited to the layout of 3*3, and may be modified to 2*2, 4*4, 5*5, etc. depending on the actual situation.

Therefore, in the spectral restoring method according to an example of the present application, inputting the local output signal data into an attention model to obtain attention local data includes: dividing the local output signal data into a plurality of predetermined regions, each predetermined region including output signal data corresponding to a plurality of pixels of the spectral imaging chip; and performing matrix multiplication for each of the predetermined regions to obtain the attention local data.

Also, prior to inputting the local output signal data into the attention model, the local output signal data, i.e. the matrix B as described above, may first be normalized to an interval [−1, 1]. Also, the transmission spectrum data, i.e. the third-order tensor A as described above, is also normalized to the interval [−1, 1].

Therefore, in the spectral restoring method according to an example of the present application, inputting the local output signal data into an attention model to obtain attention local data includes: normalizing the transmission spectrum data and the output signal data into an interval [−1, 1].

Step S340: input the local transmission spectrum data, the local output signal data and the attention local data into a neural network model to obtain the image element for spectral image reconstruction. Here, in an example of the present application, different neural network models may be used for the reconstruction of a spectral image depending on the situation of the training data set.

Figure 10:
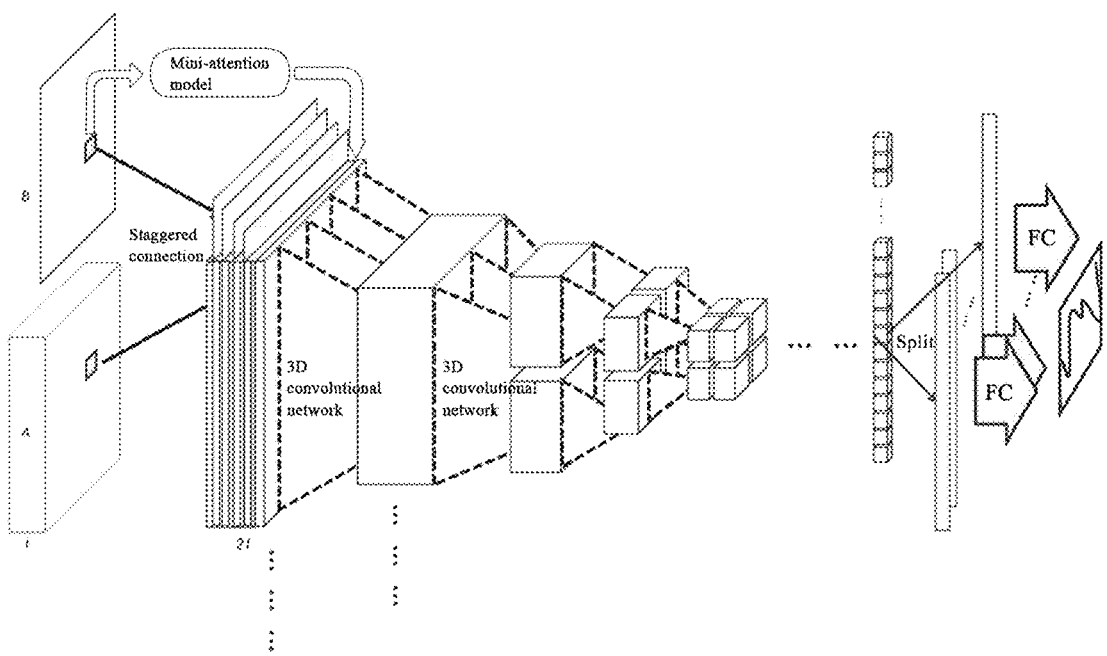
FIG. 10 illustrates a schematic diagram of a first example of a neural network model in a spectral restoring method according to an example of the present application.

FIG. 10 illustrates a schematic diagram of a first example of a neural network model in a spectral restoring method according to an example of the present application.

As shown in FIG. 10, after obtaining the attention local data processed using the mini-attention model, spectral reconstruction may be performed using a 3D convolutional neural network along with the local transmission spectrum data, represented as:

$$\hat{D}=f_{3dConv}{}^{t}(\text{cat}(\text{cat}(\hat{A}(0),\hat{B},\hat{I}),\text{cat}(\hat{A}(1),\hat{B},\hat{I}),\ldots,\text{cat}(\hat{A}(l-1),\hat{B},\hat{I})))$$

where $f_{3dConv}$ is a 3D convolutional neural network including convolutional layers, activation layers and pooling layers; and t is the number of iterations of the 3D convolutional neural network. Input data of the 3D convolutional neural network has four orders in total: (c, t, m, m), where m is the length and width of data (e.g. when taking $\hat{A}$ and $\hat{B}$, the length and width thereof are maintained as m, as described above). t represents the thickness of data, and c represents the number of channels of data. $\hat{A}$, $\hat{B}$, $\hat{I}$ is spliced on the thickness order, and the number of channel orders of the input data is 1. An output $\hat{D}$ of the 3D convolutional deep network is in the shape of (c', t', m', n'), where t' is consistent with the required number of channels of the spectral image for independent reconstruction by a subsequent FC network.

Specifically, parameters of the 3D convolutional neural network according to an example of the present application may be as follows. In a first layer of 3D convolutional network, a step length of $a^2+3$ is applied to avoid invalid computation between different attention layers and simplify the model. A step length of 1 is applied in all the remaining convolutional layers. The first layer of convolutional network uses a Sigmoid activation function, and the remaining layers use a Leaky RELU activation function. All the pooling layers are max pooling layers having length and width orders of 2 and a variable thickness order (determined by the number of spectral channels finally required to be output). Furthermore, as the network deepens, the number of channels of each layer of convolutional network may be expanded to be twice the number of channels of a layer thereon over a channel order. During training, the 3D convolutional neural network needs to be iterated and will stop iterating until the thickness thereof is the same as the number of spectral dimensions required to be output.

Also, in the above 3D convolutional neural network, the information of the thickness order is effectively preserved, and the thickness order is exactly bands in the corresponding input. Therefore, the spectrum may be further reconstructed using a unified FC network by means of the following reconstruction method:

$$s(i)=f_{FC}(\hat{D}(:,i:,:))$$

where $f_{FC}$ is a fully connected network which may be composed of one to more layers, the number of layers varying according to different requirements. Since a spectral signal on each band is reconstructed using a unified FC network, it may be referred to as a unified FC reconstruction network.

Therefore, in the spectral restoring method according to an example of the present application, inputting the local transmission spectrum data, the local output signal data and the attention local data into a neural network model to obtain the image element for spectral image reconstruction includes: cascading the local transmission spectrum data for each spectral resolution in the local transmission spectrum data, the local output signal data, and the attention local data across a thickness dimension to obtain a cascaded tensor; cascading a plurality of cascaded tensors corresponding to a plurality of spectral resolutions of the local transmission spectrum data across the thickness dimension to obtain an input tensor; inputting the input tensor into a 3D convolutional neural network to obtain an output feature map, the thickness dimension of the output feature map being the same as the number of channels of a spectral image to be reconstructed; and inputting each feature map of the output feature map across the thickness dimension into a fully connected network to obtain the image element for spectral image reconstruction.

Also, in the above spectral restoring method, input data and output data of the 3D convolutional neural network each include four dimensions: a data length, a data width, a data thickness, and the number of channels, the data thickness is equal to the number of iterations of the 3D convolutional neural network, and the number of channels of the input data is one.

Furthermore, in the above spectral restoring method, the 3D convolutional neural network includes convolutional layers, activation layers and pooling layers. The first convolutional layer has a step length of $a^2+3$, where a is the square root of the number of predetermined regions in the attention model, and the remaining convolutional layers have a step length of 1. The first convolutional layer uses a Sigmoid activation function, and the remaining layers use a Leaky RELU activation function. The pooling layers are all max pooling layers having length and width orders of 2 and a variable thickness order. The number of channels of each layer of convolutional network is twice the number of channels of a layer thereon.

Here, a first example of the neural network model is a neural network model based on deep learning, and therefore a data set is required for training In an example of the present application, the data set is acquired mainly by means of the following methods:

1. A high-precision spectral camera is used to capture a still life hyper-spectral photograph as a true value. Under the same conditions and with the same photographic parameters, a spectral camera with different modulation layers is used for photographing, and a transmission spectrum tensor A and a signal data matrix B thereof are taken as the input. This method is difficult to acquire data, but has high accuracy, and the data may be used as verification data and test data.
2. A public hyper-spectral data set is downloaded, a plurality of transmission spectrum tensors A in a product database are used to perform simulated imaging on hyper-spectral images in the database to obtain a signal data matrix B, and then an original hyper-spectral image is used as a true value for training This method may obtain a large amount of data, and is suitable for making a training data set.
3. Noise is added to the transmission spectrum tensors A in the above two methods for data enhancement.

Also, in the training process of the model, although the data in the training data set exists in the form of pictures, the above model should not directly input the entire picture for training The reason is that hyper-spectral images have strong continuity in space, and if the images are directly input for training, model convergence difficulties or over-fitting may be caused. Therefore, it is necessary to divide the entire picture into patches $\hat{A}$ and $\hat{B}$ having a side length of m according to random center coordinates, to hash and reorder spectral truth values corresponding to these patches, and to then input a batch composed of disarranged patches and corresponding spectra into a model for training.

Therefore, in the spectral restoring method according to an example of the present application, training data of the 3D convolutional neural network and the fully connected network includes at least one of the following: the transmission spectrum data and the output signal data obtained based on a still life hyper-spectral photograph captured using a high-precision spectral camera having different modulation layers; the output signal data obtained by performing simulated imaging on a hyper-spectral image in a hyper-spectral data set acquired in a public channel using the plurality of transmission spectrum data in a product database; and transmission spectrum data and output signal data obtained by adding noise to the above transmission spectrum data and output signal data.

Also, in the above spectral restoring method, during a training process of the 3D convolutional neural network and the fully connected network, the entire picture is divided into patches having a side length equal to a predetermined length according to random center coordinates, spectral truth values corresponding to these patches are hashed and reordered, and then a batch composed of disarranged patches and corresponding spectra is input into a model for training.

In the above neural network model, since training data of each multi-spectral image may be divided into a plurality of pixel points for training the model, it is suitable for the case where a training data set is small. However, since the neural network model is used each time to reconstruct only one pixel of the hyper-spectral image, the neural network model is less efficient when used to reconstruct high-resolution hyper-spectral images. The following neural network model may be used when there is a need to reconstruct high-resolution hyper-spectral images with a large data set.

Figure 11:
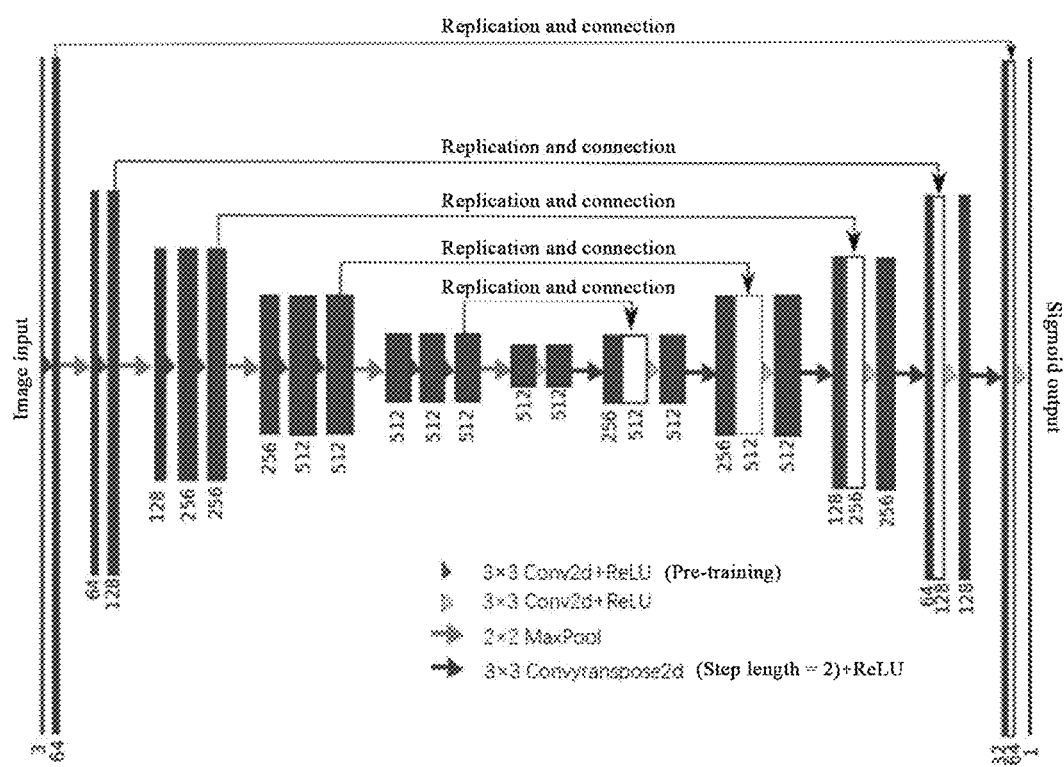
FIG. 11 illustrates a schematic diagram of a second example of a neural network model in a spectral restoring method according to an example of the present application.

FIG. 11 illustrates a schematic diagram of a second example of a neural network model in a spectral restoring method according to an example of the present application.

Specifically, when an available training data set is large, a fully convolutional network (FCN) as shown in FIG. 6 may be used instead of the above 3D convolutional neural network, and the entire spectral image is reconstructed at once.

It should be noted that the FCN is commonly used as a semantic segmentation, which has relatively poor reconstruction capability for details, and the use of only the FCN results in distortion in details of the reconstructed hyper-spectral image. Therefore, in an example of the present application, an attention model also needs to be used prior to the input of the FCN. In consideration of the particularity of spectral restoring, the restoring operation of the detailed part thereof should only refer to information of nearby pixels of a target pixel. Therefore, the range of attention is also controlled in the vicinity of each pixel. That is, each pixel adopts an attention computation mode of the above mini-attention model, and all attention layers are finally stacked together to participate in the input of the FCN, i.e.:

$$\hat{D} = f_{FCN}^t(\text{cat}(A, B, I))$$

where A is the local transmission spectrum data in the shape of (l,w,h), respectively representing a calibrated spectral resolution, width resolution and height resolution of an image; B is the local output signal data in the shape of (1, w, h); I is the attention local data in the shape of (s, w, h), $s = C_a^2$ is the number of attention layers; and $f_{FCN}^t$ is the FCN.

Each specific hyper-parameter value of the FCN may be determined through actual training result adjustment. In one example, a classical implementation method of the FCN may be used, including: adopting 5 layers of down-sampled convolutional neural network structures and 5 layers of up-sampled convtranspose neural network (CTNN) structures. In the convolutional neural network structures, each layer of convolution adopts 2-times max pooling once and the number of channels is doubled. In the convtranspose neural network structures, each layer of convtranspose adopts 2-times unpooling once and the number of channels is reduced by half. A residual connection is added into corresponding CNN and CTNN layers, and a tensor on a CNN channel is directly spliced to a CTNN channel, i.e. an implementation of u-Net (a common FCN pre-training model), as shown in FIG. 5.

Also, in usual FCN applications, the FCN output layer has only one channel. However, in an example of the present application, the output layer is a multi-spectral image, i.e. there should be c channels. Therefore, an output channel of the last CTNN layer should be c.

Therefore, in the spectral restoring method according to an example of the present application, inputting the local transmission spectrum data, the local output signal data and the attention local data into a neural network model to obtain the image element for spectral image reconstruction includes: cascading the local transmission spectrum data, the local output signal data and the attention local data to obtain input data; and inputting the input data into a fully convolutional network to obtain the image element for spectral image reconstruction.

Also, in the above spectral restoring method, the fully convolutional network includes a predetermined number of down-sampled convolutional neural networks and the predetermined number of up-sampled convtranspose neural networks. Each convolutional layer in the down-sampled convolutional neural networks has 2-times max pooling, and the number of channels thereof is twice the number of channels of the previous convolutional layer. Each convolutional layer of the up-sampled convtranspose neural networks has 2-times unpooling, and the number of channels thereof is one half of the number of channels of the previous convolutional layer. An output tensor of each convolutional layer in the down-sampled convolutional neural network is spliced with an output tensor of each convolutional layer in the up-sampled convtranspose neural networks. The number of channels of an output layer of the fully convolutional network is the number of channels of a spectral image to be reconstructed.

In the training process of the fully convolutional network, a back propagation method of training a general neural network may be followed. Since the method of reconstructing a spectral image using a FCN requires a large amount of data for training, various data enhancement methods may be used to expand the size of the training set prior to training. In addition, the data set may be enhanced by downloading a large number of RGB three-channel images and converting to multi-channel hyper-spectral images using existing public algorithms.

In addition, in order to speed up the model convergence and reduce the dependence on data, migration learning may be performed by loading into existing RGB three-channel pre-training models. The migration learning method is, for example, applying intermediate multi-layer parameters of the pre-training model to the above fully convolutional network model. Specifically, all pre-training parameters are frozen, and an input layer and an output layer are preliminarily trained. Then, the pre-training parameters are gradually unfrozen symmetrically, and a learning rate is reduced.

Finally, training of the entire network is achieved. This avoids trapping into a local minimum and speeds up the training convergence.

Therefore, in the above spectral restoring method, a training process of the fully convolutional network includes: acquiring a RGB three-channel pre-training model; freezing all pre-training parameters, and preliminarily training an input layer and an output layer; and gradually unfreezing the pre-training parameters symmetrically, and reducing a learning rate to achieve training of the entire fully convolutional network.

Although the general principles of the present application have been described above in connection with specific examples, it should be noted that the merits, advantages, effects, etc. mentioned in the present application are merely examples and are not to be considered as limiting, and these merits, advantages, effects, etc. must be possessed by the various examples of the present application. In addition, the particular details disclosed above are for purposes of example and understanding only and are not intended to be limiting, as the present application may be practiced with the particular details disclosed above.

The block diagrams of instruments, apparatuses, devices, and systems referred to in the present application are merely illustrative examples and are not intended to require or imply that the connections, arrangements and configurations must be carried out in the manner shown in the block diagrams. These instruments, apparatuses, devices, and systems may be connected, arranged and configured in any manner, as will be appreciated by those skilled in the art. The terms such as "including", "comprising" and "having" are open-ended terms that mean "including, but not limited to", and are used interchangeably therewith. The terms "or" and "and" as used herein refer to the term "and/or" and may be used interchangeably therewith unless the context clearly dictates otherwise. The term "such as" as used herein means the phrase "such as, but not limited to", and may be used interchangeably therewith.

It should also be noted that the components or steps may be disassembled and/or recombined in the apparatus, device and method of the present application. Such decompositions and/or recombinations should be considered as equivalents to the present application.

The above description of the disclosed aspects is provided to enable any person skilled in the art to make or use the present application. Various modifications to these aspects will be readily apparent to those skilled in the art, and the generic principles defined herein may be applied to other aspects without departing from the scope of the present application. Therefore, the present application is not intended to be limited to the aspects shown herein but is in accordance with the widest scope consistent with the principles and novel features disclosed herein.

The above description has been presented for purposes of illustration and description. Furthermore, this description is not intended to limit the examples of the present application to the form disclosed herein. While a number of example aspects and examples have been discussed above, those skilled in the art will recognize certain variations, modifications, changes, additions, and sub-combinations thereof.

What is claimed is:

1. A spectral restoring method, characterized by comprising:
providing a spectral imaging device, wherein the spectral imaging device includes a filter, an image sensor and a data processing unit;
receiving and modulating incident light by the filter;
acquiring a light energy response signal matrix output by the image sensor and a standard spectrum;
determining a primitive restoring function and a response signal vector of the primitive restoring function based on the light energy response signal matrix by the data processing unit, wherein the primitive restoring function restores a spectral image value of a predetermined channel corresponding thereto using a predetermined pixel value of the photosensitive chip and pixel values in the vicinity thereof;
acquiring a restoring tensor by the data processing unit, wherein the product of the restoring tensor and the response signal vector is equal to an output of the primitive restoring function based on the response signal vector; and
obtaining a restored spectral image based on the product of the restoring tensor and the response signal vector by the data processing unit.

2. The spectral restoring method according to claim 1, wherein the light energy response signal matrix is represented as a matrix B including two dimensions of an image width w and an image height h, and the number of dimensions of the standard spectrum is 1, and a distance from the product of a spectral image true value tensor received by the spectral imaging device and the standard spectrum to a spectral image tensor to be restored is set to be minimum.

3. The spectral restoring method according to claim 2, wherein the standard spectrum is represented as s, and a channel standard spectrum corresponding to a kth channel of the standard spectrum is represented as $s_k$, whereby:

$$x_k \rightarrow O(i,j)s_k$$

where $x_k$ is a spectral image value of the $k^{th}$ channel of a certain spectral pixel, $O(i,j)$ is a spectral curve true value tensor of a certain spectral pixel, and $\rightarrow$ represents that a Euclidean distance between tensors is minimum.

4. The spectral restoring method according to claim 1, wherein the primitive restoring function uses pixel values at a distance of a predetermined threshold p from the predetermined pixel in width and height, and a response signal vector of the predetermined pixel is denoted as $\hat{b}$, represented as:

$$f_{i,j,k}(B(i-p:i+p,j-p:j+p))=f_{i,j,k}(\hat{b}_{i,j})=f_{i,j,k}(\hat{b}).$$

5. The spectral restoring method according to claim 4, wherein the restoring tensor is denoted as C, and a channel restoring vector for restoring a value of the $k^{th}$ channel of the predetermined pixel in the restoring tensor is denoted as $c_k$, then:

$$f(\hat{b})=c_k \cdot \hat{b}$$

where $f_k(\hat{b})$ is an output of the primitive restoring function based on the response signal vector $\hat{b}$.

6. The spectral restoring method according to claim 1, wherein a solving process of the restoring tensor comprises:
establishing a first constraint equation based on the restoring tensor, a spectral response tensor block of the spectral response tensor of the spectral imaging device corresponding to the primitive restoring function, and the standard spectrum;
establishing a second constraint equation based on the restoring tensor and the spectral response tensor block; and
obtaining the restoring tensor based on the first constraint equation and the second constraint equation.

7. The spectral restoring method according to claim 6, wherein the first constraint equation is that the product of the channel restoring vector $c_k$, a spectral response tensor block $\hat{A}$ corresponding to the primitive restoring function in the spectral response tensor, and the channel standard spectrum $s_k$ is equal to one, represented as:

$$c_k \hat{A} s_k = 1$$

where $\hat{A}$ is a spectral response tensor block $A(i-p:i+p,j-p:j+p,:)$ of the spectral response tensor of the spectral imaging device for restoring $X_{i,j}$, and first and second orders of the tensor block are rearranged to the same order to form a matrix in the shape of $(a^2, l)$, and the spectral response tensor is represented as a tensor A including three dimensions of an image width w, an image height h and a calibration resolution l.

8. The spectral restoring method according to claim 6, wherein the second constraint equation is that the product of the channel restoring vector $c_k$, a spectral response tensor block $\hat{A}$ corresponding to the primitive restoring function in the spectral response tensor, and a unit vector is constrained to 0, represented as:

$$c_k \tilde{A} e \to 0$$

where e is a unit vector.

9. The spectral restoring method according to claim 8, wherein obtaining the restoring tensor based on the first constraint equation and the second constraint equation comprises:

obtaining the restoring tensor based on the first constraint equation, the second constraint equation and a third constraint equation, the third constraint equation being that the product of a 2-norm of the product of a Tikhonov matrix and the channel restoring vector $c_k$ and a Lagrange multiplier $\lambda$ of a regular term is constrained to 0, represented as:

$$\lambda \|(D c_k)\|_2 \to 0.$$

10. The spectral restoring method according to claim 9, wherein solving the first constraint equation, the second constraint equation and the third constraint equation to obtain the restoring tensor comprises:

multiplying the first constraint equation by a sensitivity coefficient, and adding the product to the second constraint equation and the third constraint equation to obtain a combination equation, represented as:

$$g(c_k) = (c_k \tilde{A} e)^2 + \lambda \|D c_k\|_2^2 + \alpha (c_k \hat{A} s_k - 1)^2 \to 0;$$

deriving and zeroing the combination equation, represented as:

$$g'(c_k) = 0;$$

obtaining the channel restoring vector as:

$$c_k = \alpha (\hat{A}^T e^T e \hat{A} + \lambda D^T D + \alpha s_k^T \hat{A}^T \hat{A} s_k)^{-1} \cdot \hat{A} s_k;$$

iterating the above steps to obtain the entire restoring tensor as:

$$C(i,j,:,k) = \alpha (\hat{A}_{i,j}^T \hat{A}_{i,j} + \lambda D^T D + \alpha s_k^T \hat{A}_{i,j}^T \hat{A}_{i,j} s_k)^{-1} \cdot \hat{A}_{i,j} s_k.$$

11. The spectral restoring method according to claim 7, wherein the second constraint equation is that a 2-norm of the product of the channel restoring vector $c_k$ and a spectral response tensor block $\hat{A}$ corresponding to the primitive restoring function in the spectral response tensor is constrained to 0, represented as:

$$\|c_k \hat{A}\|_2 \to 0.$$

12. The spectral restoring method according to claim 11, wherein obtaining the restoring tensor based on the first constraint equation and the second constraint equation comprises obtaining the restoring tensor based on the first constraint equation, the second constraint equation and the third constraint equation, and comprises:

multiplying the first constraint equation by a sensitivity coefficient, and adding the product to the second constraint equation and the third constraint equation to obtain a combination equation, represented as:

$$g(c_k) = \|c_k \hat{A}\|_2^2 + \lambda \|(D c_k)\|_2^2 + \alpha (c_k \hat{A} s_k - 1)^2 \to 0;$$

deriving and zeroing the combination equation, represented as:

$$g'(c_k) = 0;$$

obtaining the channel restoring vector as:

$$c_k = \alpha (\hat{A}^T \hat{A} + \lambda D^T D + \alpha s_k^T \hat{A}^T \hat{A} s_k)^{-1} \cdot \hat{A} s_k.$$

13. The spectral restoring method according to claim 6, wherein the first constraint equation is represented as:

$$f_k(\hat{b}, \hat{A} s_k) = 1$$

where $f_k$ is a neural network composed of a connection layer and an activation layer, and $\hat{A}$ is a spectral response tensor block $A(i-p:i+p, j-p:j+p, :)$ corresponding to the primitive restoring function in the spectral response tensor, and first and second orders of the tensor block are rearranged to the same order to form a matrix in the shape of $(a^2, l)$.

14. The spectral restoring method according to claim 13, wherein the second constraint equation is represented as:

$$f_k(\hat{b}, \hat{A}) \to 0.$$

15. The spectral restoring method according to claim 14, wherein obtaining the restoring tensor based on the first constraint equation and the second constraint equation comprises:

obtaining the restoring tensor based on the first constraint equation, the second constraint equation and the third constraint equation, the third constraint equation being represented as:

$$f_k(N * \hat{b}, \hat{A} s_k) \to 1$$

$$f_k(N * \hat{b}, \hat{A}) \to 0$$

where N is a noise factor and is a random number matrix in the shape of (a, a), which is expected to be 0 and obeys a Gaussian distribution.

16. The spectral restoring method according to claim 15, further comprising: establishing a fourth constraint equation:

$$f_k(N * \hat{b}, \hat{A} t) \to t \cdot s_k.$$

17. The spectral restoring method according to claim 16, wherein solving the first constraint equation, the second constraint equation and the third constraint equation to obtain the restoring tensor comprises:

training the neural network based on a data set for spectral restoring by the trained neural network.

* * * * *